US011942055B2

(12) United States Patent
Park et al.

(10) Patent No.: US 11,942,055 B2
(45) Date of Patent: Mar. 26, 2024

(54) DISPLAY SYSTEM PERFORMING DISPLAY PANEL COMPENSATION AND METHOD OF COMPENSATING DISPLAY PANEL

(71) Applicant: SAMSUNG ELECTRONICS CO., LTD., Suwon-si (KR)

(72) Inventors: Deoksoo Park, Hwaseong-si (KR); Sungchul Yoon, Suwon-si (KR); Joohyuk Yum, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 306 days.

(21) Appl. No.: 17/530,710

(22) Filed: Nov. 19, 2021

(65) Prior Publication Data

US 2022/0246108 A1 Aug. 4, 2022

(30) Foreign Application Priority Data

Feb. 1, 2021 (KR) ........................ 10-2021-0014152
Apr. 5, 2021 (KR) ........................ 10-2021-0043924

(51) Int. Cl.

*G09G 3/36* (2006.01)
*G09G 3/20* (2006.01)
*G09G 3/3233* (2016.01)

(52) U.S. Cl.

CPC ......... *G09G 3/3648* (2013.01); *G09G 3/2092* (2013.01); *G09G 3/3233* (2013.01); *G09G 2320/0233* (2013.01); *G09G 2320/0285* (2013.01); *G09G 2320/045* (2013.01); *G09G 2320/046* (2013.01)

(58) Field of Classification Search

CPC .......... G09G 3/2092–2096; G09G 3/32–3291; G09G 2320/0285; G09G 2320/04–048; G09G 2320/029–0295; G09G 2360/14–148

See application file for complete search history.

(56) References Cited

U.S. PATENT DOCUMENTS

| | | | | |
|---|---|---|---|---|
| 8,405,585 | B2 | 3/2013 | Wang et al. | |
| 8,855,412 | B2 | 10/2014 | Quan et al. | |
| 9,773,455 | B2 * | 9/2017 | Chung | G09G 3/3225 |
| 9,830,851 | B2 | 11/2017 | Zhuang et al. | |
| 10,163,389 | B2 * | 12/2018 | An | G09G 3/3208 |
| 10,276,085 | B2 | 4/2019 | Wang et al. | |
| 10,325,547 | B2 * | 6/2019 | Kim | G09G 3/2092 |
| 10,460,701 | B2 | 10/2019 | Luo et al. | |
| 10,593,247 | B2 | 3/2020 | Zhuang et al. | |
| 10,726,810 | B2 * | 7/2020 | Lee | G09G 3/20 |
| 11,295,677 | B2 * | 4/2022 | An | G09G 3/2025 |
| 11,436,958 | B2 * | 9/2022 | Lee | G09G 3/2085 |

(Continued)

*Primary Examiner* — Patrick F Marinelli

(74) *Attorney, Agent, or Firm* — Sughrue Mion, PLLC

(57) ABSTRACT

A display system includes: a host processor configured to compensate at least one set of frame data based on at least one set of panel map data including a plurality of offset values corresponding to a plurality of pixels of a display panel, generate at least one set of compensated frame data, and output the compensated frame data; and a display driver integrated circuit configured to receive the compensated frame data from the host processor, and control the display panel such that at least one frame image corresponding to the compensated frame data is displayed on the display panel.

18 Claims, 25 Drawing Sheets

(56) References Cited

U.S. PATENT DOCUMENTS

| | | | | |
|---|---|---|---|---|
| 2009/0058772 | A1* | 3/2009 | Lee | G09G 3/3233 345/82 |
| 2016/0343301 | A1 | 11/2016 | Choi et al. | |
| 2017/0053587 | A1* | 2/2017 | Kim | G09G 3/2092 |
| 2018/0012563 | A1* | 1/2018 | Lee | G09G 5/10 |
| 2018/0075798 | A1 | 3/2018 | Nho et al. | |
| 2020/0005693 | A1 | 1/2020 | Furihata et al. | |
| 2022/0246108 | A1* | 8/2022 | Park | G09G 3/3225 |

* cited by examiner

FIG. 4A

FIMG

| | | | | | | | |
|---|---|---|---|---|---|---|---|
| PV_11 | PV_12 | PV_13 | PV_14 | PV_15 | PV_16 | PV_17 | PV_18 |
| PV_21 | PV_22 | PV_23 | PV_24 | PV_25 | PV_26 | PV_27 | PV_28 |
| PV_31 | PV_32 | PV_33 | PV_34 | PV_35 | PV_36 | PV_37 | PV_38 |
| PV_41 | PV_42 | PV_43 | PV_44 | PV_45 | PV_46 | PV_47 | PV_48 |
| PV_51 | PV_52 | PV_53 | PV_54 | PV_55 | PV_56 | PV_57 | PV_58 |
| PV_61 | PV_62 | PV_63 | PV_64 | PV_65 | PV_66 | PV_67 | PV_68 |
| PV_71 | PV_72 | PV_73 | PV_74 | PV_75 | PV_76 | PV_77 | PV_78 |
| PV_81 | PV_82 | PV_83 | PV_84 | PV_85 | PV_86 | PV_87 | PV_88 |
| PV_91 | PV_92 | PV_93 | PV_94 | PV_95 | PV_96 | PV_97 | PV_98 |
| PV_A1 | PV_A2 | PV_A3 | PV_A4 | PV_A5 | PV_A6 | PV_A7 | PV_A8 |
| PV_B1 | PV_B2 | PV_B3 | PV_B4 | PV_B5 | PV_B6 | PV_B7 | PV_B8 |
| PV_C1 | PV_C2 | PV_C3 | PV_C4 | PV_C5 | PV_C6 | PV_C7 | PV_C8 |

FIG. 4B

PMAP_P

| | | | | | | | |
|---|---|---|---|---|---|---|---|
| POV_11 | POV_12 | POV_13 | POV_14 | POV_15 | POV_16 | POV_17 | POV_18 |
| POV_21 | POV_22 | POV_23 | POV_24 | POV_25 | POV_26 | POV_27 | POV_28 |
| POV_31 | POV_32 | POV_33 | POV_34 | POV_35 | POV_36 | POV_37 | POV_38 |
| POV_41 | POV_42 | POV_43 | POV_44 | POV_45 | POV_46 | POV_47 | POV_48 |
| POV_51 | POV_52 | POV_53 | POV_54 | POV_55 | POV_56 | POV_57 | POV_58 |
| POV_61 | POV_62 | POV_63 | POV_64 | POV_65 | POV_66 | POV_67 | POV_68 |
| POV_71 | POV_72 | POV_73 | POV_74 | POV_75 | POV_76 | POV_77 | POV_78 |
| POV_81 | POV_82 | POV_83 | POV_84 | POV_85 | POV_86 | POV_87 | POV_88 |
| POV_91 | POV_92 | POV_93 | POV_94 | POV_95 | POV_96 | POV_97 | POV_98 |
| POV_A1 | POV_A2 | POV_A3 | POV_A4 | POV_A5 | POV_A6 | POV_A7 | POV_A8 |
| POV_B1 | POV_B2 | POV_B3 | POV_B4 | POV_B5 | POV_B6 | POV_B7 | POV_B8 |
| POV_C1 | POV_C2 | POV_C3 | POV_C4 | POV_C5 | POV_C6 | POV_C7 | POV_C8 |

FIG. 4C

CFIMG

| | | | | | | | |
|---|---|---|---|---|---|---|---|
| CPV_11 | CPV_12 | CPV_13 | CPV_14 | CPV_15 | CPV_16 | CPV_17 | CPV_18 |
| CPV_21 | CPV_22 | CPV_23 | CPV_24 | CPV_25 | CPV_26 | CPV_27 | CPV_28 |
| CPV_31 | CPV_32 | CPV_33 | CPV_34 | CPV_35 | CPV_36 | CPV_37 | CPV_38 |
| CPV_41 | CPV_42 | CPV_43 | CPV_44 | CPV_45 | CPV_46 | CPV_47 | CPV_48 |
| CPV_51 | CPV_52 | CPV_53 | CPV_54 | CPV_55 | CPV_56 | CPV_57 | CPV_58 |
| CPV_61 | CPV_62 | CPV_63 | CPV_64 | CPV_65 | CPV_66 | CPV_67 | CPV_68 |
| CPV_71 | CPV_72 | CPV_73 | CPV_74 | CPV_75 | CPV_76 | CPV_77 | CPV_78 |
| CPV_81 | CPV_82 | CPV_83 | CPV_84 | CPV_85 | CPV_86 | CPV_87 | CPV_88 |
| CPV_91 | CPV_92 | CPV_93 | CPV_94 | CPV_95 | CPV_96 | CPV_97 | CPV_98 |
| CPV_A1 | CPV_A2 | CPV_A3 | CPV_A4 | CPV_A5 | CPV_A6 | CPV_A7 | CPV_A8 |
| CPV_B1 | CPV_B2 | CPV_B3 | CPV_B4 | CPV_B5 | CPV_B6 | CPV_B7 | CPV_B8 |
| CPV_C1 | CPV_C2 | CPV_C3 | CPV_C4 | CPV_C5 | CPV_C6 | CPV_C7 | CPV_C8 |

FIG. 4D

PMAP_B

| | | | | | | | |
|---|---|---|---|---|---|---|---|
| BOV_11 | BOV_12 | BOV_13 | BOV_14 | BOV_15 | BOV_16 | BOV_17 | BOV_18 |
| BOV_21 | BOV_22 | BOV_23 | BOV_24 | BOV_25 | BOV_26 | BOV_27 | BOV_28 |
| BOV_31 | BOV_32 | BOV_33 | BOV_34 | BOV_35 | BOV_36 | BOV_37 | BOV_38 |
| BOV_41 | BOV_42 | BOV_43 | BOV_44 | BOV_45 | BOV_46 | BOV_47 | BOV_48 |
| BOV_51 | BOV_52 | BOV_53 | BOV_54 | BOV_55 | BOV_56 | BOV_57 | BOV_58 |
| BOV_61 | BOV_62 | BOV_63 | BOV_64 | BOV_65 | BOV_66 | BOV_67 | BOV_68 |

10b

10c

10d

10e

10f

10g

10h

DISPLAY SYSTEM PERFORMING DISPLAY PANEL COMPENSATION AND METHOD OF COMPENSATING DISPLAY PANEL

CROSS-REFERENCE TO RELATED APPLICATION

This application claims priority from Korean Patent Application No. 10-2021-0014152 filed on Feb. 1, 2021 and to Korean Patent Application No. 10-2021-0043924 filed on Apr. 5, 2021 in the Korean Intellectual Property Office (KIPO), the contents of which are herein incorporated by reference in their entirety.

BACKGROUND

1. Field

Apparatuses and methods consistent with example embodiments relate to compensating pixel values of an image frame displayed on a display panel.

2. Description of the Related Art

As information technology is developed, a display device becomes important to provide information to a user. Various display devices such as a liquid crystal display (LCD), a plasma display, and an electroluminescent display have gained popularity. Among these, the electroluminescent display has quick response speed and reduced power consumption, using light-emitting diodes (LEDs) or organic light-emitting diodes (OLEDs) that emit light through recombination of electrons and holes. Differences in brightness, color, etc. may occur on a display panel included in a display device due to various conditions such as variations in a manufacturing process, aging depending on usage patterns, etc. Recently, various schemes for compensating the differences have been researched.

SUMMARY

At least one embodiment of the present disclosure provides a display system capable of precisely and efficiently performing display panel compensation in real-time.

At least one embodiment of the present disclosure provides a method of compensating a display panel that is performed by the display system.

According to embodiments, there is provided a display system that may include: a host processor configured to compensate at least one set of frame data based on at least one set of panel map data including a plurality of offset values corresponding to a plurality of pixels of a display panel, generate at least one set of compensated frame data, and output the compensated frame data; and a display driver integrated circuit configured to receive the compensated frame data from the host processor, and control the display panel such that at least one frame image corresponding to the compensated frame data is displayed on the display panel.

According to embodiments, there is provided a method of compensating a display panel. The method may include: loading, by a host processor, at least one set of panel map data from a first memory, the first memory storing the panel map data and being disposed outside or included in the host processor, the panel map data including a plurality of offset values that are used to respectively compensate a plurality of pixels included in the display panel; storing, by the host processor, the panel map data in a second memory, the second memory being included in the host processor; generating, by the host processor, at least one set of compensated frame data by compensating at least one set of frame data based on the panel map data; outputting, by the host processor, the compensated frame data; receiving, by a display driver integrated circuit, the compensated frame data; and controlling, by the display driver integrated circuit, the display panel such that at least one frame image corresponding to the compensated frame data is displayed on the display panel.

According to embodiments, there is provided a display system that may include: a nonvolatile memory configured to store at least one set of panel map data including a plurality of offset values corresponding to a plurality of pixels included in a display panel, the panel map data being compressed; a host processor configured to generate at least one set of compensated frame data by compensating at least one set of frame data based on the panel map data; and a display driver integrated circuit configured to receive the compensated frame data from the host processor, and control the display panel such that at least one frame image corresponding to the compensated frame data is displayed on the display panel. Here, the host processor may include: a volatile memory configured to store the panel map data; a panel compensator configured to generate the compensated frame data by compensating the frame data based on the plurality of offset values, and periodically generate updated panel map data based on the frame data or the compensated frame data, the frame data including a plurality of pixel values, the compensated frame data including a plurality of compensated pixel values, the plurality of compensated pixel values being generated by compensating the plurality of pixel values based on the plurality of offset values, the updated panel map data being different from the panel map data; a decompressor configured to decompress the panel map data, and provide the decompressed panel map data to the panel compensator; a compressor configured to compress the updated panel map data, and provide the compressed updated panel map data to the volatile memory; and a display interface configured to output the compensated frame data, wherein the volatile memory is configured to periodically store the updated panel map data, and, after the updated panel map data is generated, the panel compensator is configured to generate the compensated frame data based on the panel map data and the updated panel map data.

In the display system and the method of compensating the display panel according to embodiments, the host processor rather than the display driver integrated circuit may perform the display panel compensation. The display driver integrated circuit may perform the display panel compensation only in a limited range, condition and precision due to process and space reasons. In contrast, the host processor may precisely perform the display panel compensation in units of pixels using the first and second memories and the panel compensator, may perform the display panel compensation in various ranges and conditions, and may perform other compensation for any combination required in brightness or other conditions. Accordingly, the display panel compensation may be performed flexibly and precisely, and thus the display system may have improved or enhanced display quality.

BRIEF DESCRIPTION OF DRAWINGS

Illustrative, non-limiting embodiments will be more clearly understood from the following detailed description taken in conjunction with the accompanying drawings.

FIGS. 3, 4A, 4B, 4C, 4D and 4E are diagrams for describing an operation of a display system, according to embodiments.

DETAILED DESCRIPTION OF EMBODIMENTS

Figure 1:
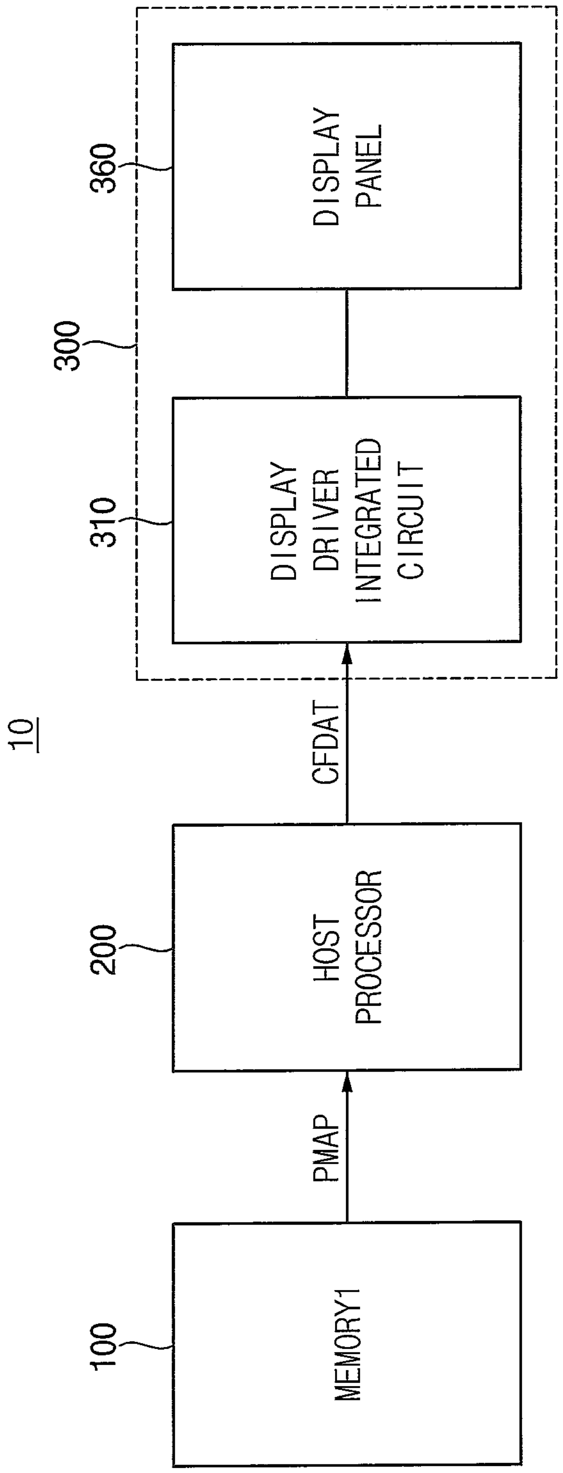
FIG. 1 is a block diagram illustrating a display system, according to embodiments.

Various embodiments will be described more fully with reference to the accompanying drawings. It is understood that all of the embodiments described herein are example embodiments, and thus, the present disclosure may be embodied in many different forms and should not be construed as limited to the embodiments set forth herein. Like reference numerals refer to like elements throughout this application.

FIG. 1 is a block diagram illustrating a display system according to an embodiment.

Referring to FIG. 1, a display system 10 includes a first memory 100, a host processor 200 and a display device 300. The display device 300 includes a display driver integrated (DDI) circuit 310 and a display panel 360.

The first memory 100 may be disposed outside the host processor 200. However, according to another embodiment, the first memory may be included in the host processor 200. The first memory 100 stores at least one set of panel map data PMAP. The panel map data PMAP includes a plurality of offset values that are used to differently compensate a plurality of pixels included in the display panel 360. Examples of the panel map data PMAP will be described with reference to FIGS. 4B and 4D.

In some embodiments, the first memory 100 may include a nonvolatile memory. The nonvolatile memory may retain stored data when disconnected from power, and thus, the first memory 100 may store the at least one panel map data PMAP regardless of whether power is supplied or not. For example, the nonvolatile memory may include any nonvolatile memory, e.g., an electrically erasable programmable read-only memory (EEPROM), a flash memory, a phase random access memory (PRAM), a resistive random access memory (RRAM), a nano floating gate memory (NFGM), a polymer random access memory (PoRAM), a magnetic random access memory (MRAM), a ferroelectric random access memory (FRAM), or the like.

In some embodiments, the panel map data PMAP may include compensation information for compensating or correcting variations, defects, etc. of the display panel 360 for various conditions and/or situations. For example, the panel map data PMAP (e.g., a plurality of offset values included in the at least one panel map data PMAP) may include information for compensating a spot or stain (e.g., Mura) on the display panel 360. For another example, the panel map data PMAP may include information for compensating a voltage drop (e.g., IR drop) in the display panel 360. Alternatively, the panel map data PMAP may include information for compensating deterioration or degradation (e.g., burn-in) due to cumulative usage of the display panel 360. However, embodiments are not limited thereto, and the panel map data PMAP may include one or more of various other information for compensating the display panel 360. It is to be understood that the expression “compensating a display panel” may refer to compensating pixel values of the display panel.

In some embodiments, the panel map data PMAP may be obtained while the display system 10 and/or the display panel 360 are manufactured, and may be stored in advance (or pre-stored) in the first memory 100. In other embodiments, the panel map data PMAP may be obtained after the display system 10 is provided to and used by a user (e.g., when a product abnormality and/or malfunction occurs, and a repair is required while the display system 10 is in use), and may be stored in the first memory 100 after the repair is performed.

The host processor 200 controls overall operations of the display system 10. The host processor 200 loads the panel map data PMAP from the first memory 100, stores the panel map data PMAP, generates at least one set of compensated frame data CFDAT by compensating at least one set of frame data based on the panel map data PMAP, and outputs the compensated frame data CFDAT. In other words, the host processor 200 may internally perform display panel compensation (or panel compensation operation) by itself based on the panel map data PMAP.

In some embodiments, the host processor 200 may be implemented in the form of an application processor (AP) or a system-on-chip (SoC).

The display driver integrated circuit 310 controls an operation of the display device 300. The display driver integrated circuit 310 receives the compensated frame data CFDAT from the host processor 200, and controls the display panel 360 such that at least one frame image corresponding to the compensated frame data CFDAT is displayed on the display panel 360.

The display panel 360 may perform an image display operation (e.g., may display a frame image) based on or under a control of the display driver integrated circuit 310.

Detailed configurations and operations of the host processor 200 and the display driver integrated circuit 310 will be described with reference to FIGS. 2 through 7.

Figure 2:
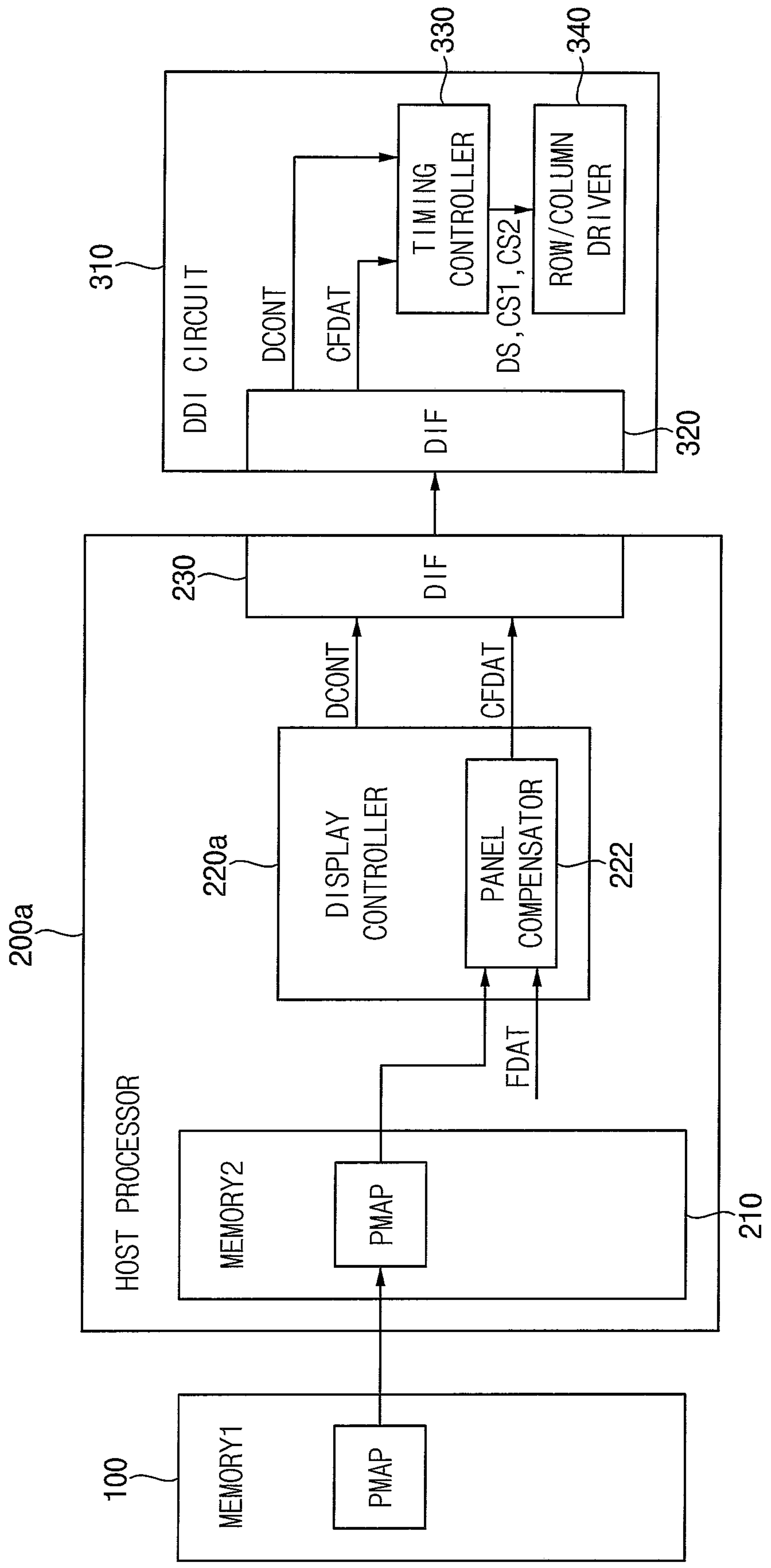
FIG. 2 is a block diagram illustrating an of a display system of FIG. 1, according to embodiments.

FIG. 2 is a block diagram illustrating an example of a display system of FIG. 1.

Referring to FIG. 2, a display system 10*a* includes a first memory 100, a host processor 200*a* and a display driver integrated circuit 310. For convenience of illustration, the display panel 360 in FIG. 1 is omitted.

The first memory 100 may be substantially the same as that described with reference to FIG. 1. For example, file system codes for managing the panel map data PMAP may be implemented in the first memory 100.

The host processor 200*a* may include a second memory 210, a display controller 220*a* and a display interface (DIF) 230.

The second memory 210 may be disposed inside the host processor 200, and may store at least one set of panel map data PMAP that is loaded from the first memory 100. The second memory 210 may be referred to as a system memory of the host processor 200*a*. In addition, the second memory 210 may store instructions, data, etc. that are required for an operation of the host processor 200*a*.

In some embodiments, the second memory 210 may include a volatile memory. The volatile memory may lose stored data when disconnected from power and may perform read and write operations at a high speed, and thus the second memory 210 may operate as a frame buffer and may be used to perform the display panel compensation. For example, the volatile memory may include any volatile memory, e.g., a dynamic random access memory (DRAM), a static random access memory (SRAM), or the like.

The display controller 220*a* may control operations of the display device 300 and the display driver integrated circuit 310. The display controller 220*a* may generate the compensated frame data CFDAT by performing the display panel compensation, and may generate a display control signal DCONT for controlling the display driver integrated circuit 310. For example, the display control signal DCONT and the compensated frame data CFDAT may be generated and output in the form of a packet. The display controller 220*a* may be referred to as a display processing unit (DPU).

The display controller 220*a* may include a panel compensator 222. The panel compensator 222 may generate the compensated frame data CFDAT by compensating at least one set of frame data FDAT based on the panel map data PMAP including the plurality of offset values. The frame data FDAT may include a plurality of pixel values. The compensated frame data CFDAT may include a plurality of compensated pixel values. The plurality of compensated pixel values may be generated by compensating the plurality of pixel values of the frame data FDAT based on the plurality of offset values of the panel map data PMAP. For example, the panel compensator 222 may be implemented as a hardware intellectual property (IP). For example, the display panel compensation may be performed on a frame-by-frame basis (e.g., every frame) in real-time or during a runtime.

The display interface 230 may output and transmit the compensated frame data CFDAT and the display control signal DCONT to the display driver integrated circuit 310.

In some embodiments, the display interface 230 may be implemented based on one of various display interface standards, e.g., one of a mobile industry processor interface (MIPI), a high definition multimedia interface (HDMI), a display port (DP), a low power display port (LPDP) and an advanced low power display port (ALPDP).

In some embodiments, when a precision (or resolution) of the compensated frame data CFDAT is increased by the display panel compensation, the overall bit depth of the display interface 230 may be increased.

When the display system 10*a* is driven to perform the display panel compensation in the host processor 200*a* for every frame, it may be necessary to load the panel map data PMAP from the first memory 100 in software. The loaded panel map data PMAP may be stored in the second memory 210, may be read from the second memory 210 through a direct memory access (DMA) of the display controller 220*a*, and may be transmitted to the panel compensator 222. The panel compensator 222 may perform the display panel compensation based on compensation information for every pixel include in the panel map data PMAP, and may transmit the compensated pixel values as the compensated frame data CFDAT to the display driver integrated circuit 310.

Although not illustrated in FIG. 2, the host processor 200*a* may further include a main processor, a system bus, a plurality of functional modules and a power management integrated circuit (PMIC). The main processor may control overall operations of the host processor 200*a*, and may provide the frame data FDAT. The system bus may correspond to a signal transmission path between the components in the host processor 200*a*. The plurality of functional modules may perform various functions of the host processor 200*a*. The power management integrated circuit may provide operating voltages to the components in the host processor 200*a*.

In some embodiments, the plurality of functional modules may include a communication module that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, or the like), a camera module that performs a camera function, an input-output (I/O) module that performs a user interface function (e.g., a touch panel module that performs a touch sensing function), and an audio module including a microphone (MIC) module, a speaker module, or the like, that performs an I/O of audio signals. In some embodiments, the plurality of functional modules may further include a global positioning system (GPS) module, a gyroscope module, or the like.

The display driver integrated circuit 310 may include a display interface 320, a timing controller 330 and a row/column driver 340.

The display interface 320 may receive the compensated frame data CFDAT and the display control signal DCONT from the host processor 200*a*. For example, the display interface 320 may be implemented based on the display interface standard that is substantially the same as that of the display interface 230.

The timing controller 330 may generate a first control signal CS1, a second control signal CS2 and a data signal DS based on the compensated frame data CFDAT and the display control signal DCONT.

The row/column driver 340 may generate a plurality of data voltages (e.g., a data voltage VDAT in FIG. 14A) and a plurality of scan signals (e.g., a scan signal SSC in FIG. 14A) based on the first control signal CS1, the second control signal CS2 and the data signal DS, and may provide the plurality of data voltages and the plurality of scan signals to the display panel 360. The display panel 360 may display the frame image corresponding to the compensated frame data CFDAT based on the plurality of data voltages and the plurality of scan signals.

Although not illustrated in FIG. 2, the display driver integrated circuit 310 may further include a frame buffer, etc. The frame buffer may temporarily store the compensated frame data CFDAT.

In the display system according to embodiments, the host processor 200*a* rather than the display driver integrated circuit 310 may perform the display panel compensation. The display driver integrated circuit 310 may perform the display panel compensation only in a limited range, condition and precision due to process and space reasons. In contrast, the host processor 200*a* may precisely perform the display panel compensation in units of pixels using the first and second memories 100 and 210 and the panel compensator 222, may perform the display panel compensation in various ranges and conditions, and may perform other compensation for any combination required in brightness or other conditions. Accordingly, the display panel compensation may be performed flexibly and precisely by the host processor 200*a* including the panel compensator 222, and thus, the display system may have improved or enhanced display quality.

FIGS. 3, 4A, 4B, 4C, 4D and 4E are diagrams for describing an operation of a display system according to embodiments. Operations of FIGS. 3, 4A, 4B, 4C, 4D and 4E will be described based on the display system 10*a* of FIG. 2.

Figure 3:
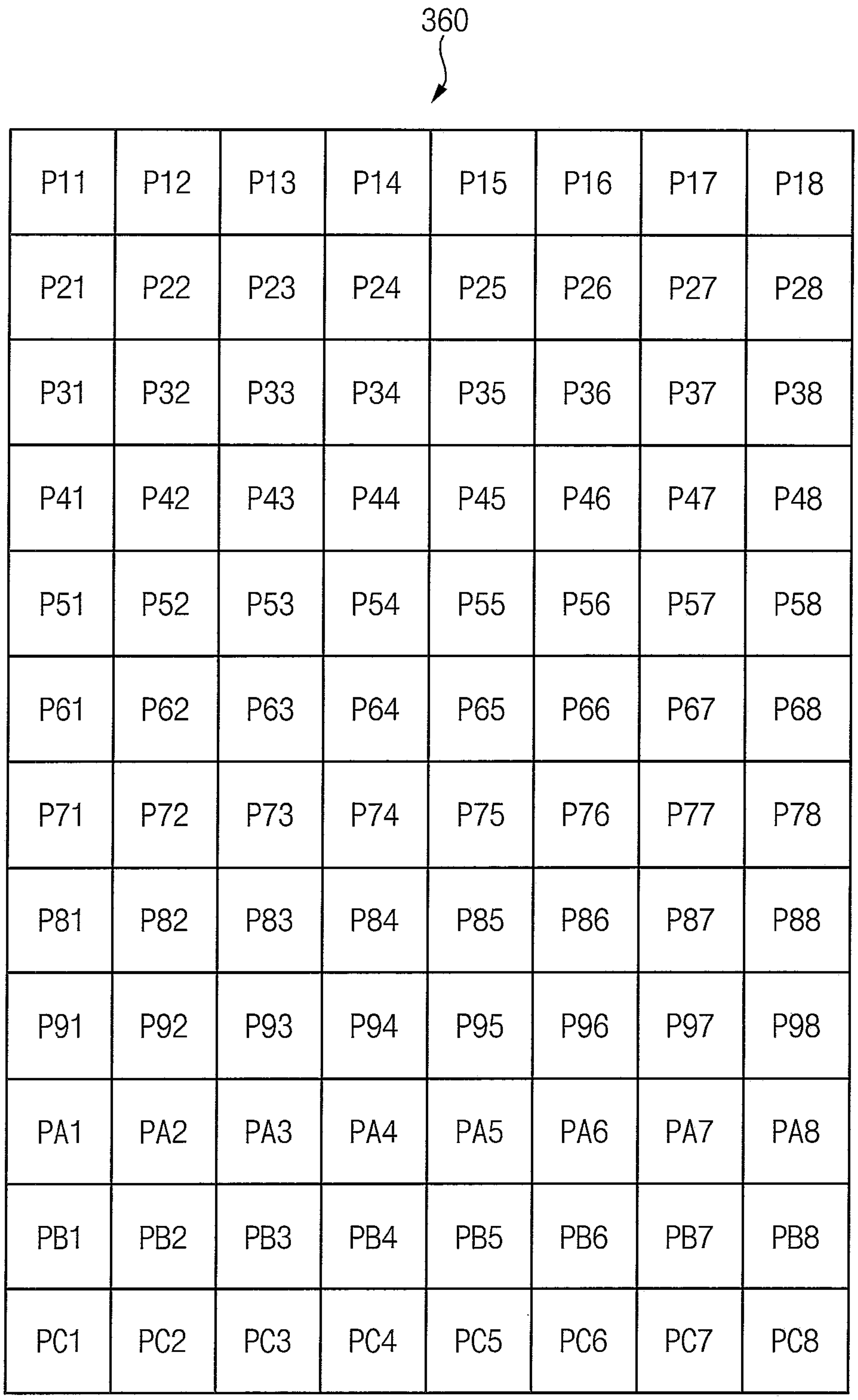

Referring to FIG. 3, the display panel 360 that displays an image based on the compensated frame data CFDAT output from the host processor 200*a* may include a plurality of pixels P11, P12, P13, P14, P15, P16, P17, P18, P21, P22, P23, P24, P25, P26, P27, P28, P31, P32, P33, P34, P35, P36, P37, P38, P41, P42, P43, P44, P45, P46, P47, P48, P51, P52, P53, P54, P55, P56, P57, P58, P61, P62, P63, P64, P65, P66, P67, P68, P71, P72, P73, P74, P75, P76, P77, P78, P81, P82, P83, P84, P85, P86, P87, P88, P91, P92, P93, P94, P95, P96, P97, P98, PA1, PA2, PA3, PA4, PA5, PA6, PA7, PA8, PB1, PB2, PB3, PB4, PB5, PB6, PB7, PB8, PC1, PC2, PC3, PC4, PC5, PC6, PC7 and PC8.

In some embodiments, the display panel 360 may be an organic light emitting display panel, and each pixel may include an organic light emitting diode (OLED) and at least one transistor. In other embodiments, the display panel 360 may be a liquid crystal display panel, and each pixel may include a liquid crystal capacitor and at least one transistor. Examples of each pixel will be described with reference to FIGS. 14A and 14B.

Although FIG. 3 illustrates that the display panel 360 includes 12×8 pixels, embodiments are not limited thereto.

Referring to FIG. 4A, one frame image FIMG that is displayed on the display panel 360 of FIG. 3 based on one frame data is illustrated. For example, the frame image FIMG may represent an image entirely displayed on one screen of the display panel 360.

The frame image FIMG may include a plurality of pixel values PV_11, PV_12, PV_13, PV_14, PV_15, PV_16, PV_17, PV_18, PV_21, PV_22, PV_23, PV_24, PV_25, PV_26, PV_27, PV_28, PV_31, PV_32, PV_33, PV_34, PV_35, PV_36, PV_37, PV_38, PV_41, PV_42, PV_43, PV_44, PV_45, PV_46, PV_47, PV_48, PV_51, PV_52, PV_53, PV_54, PV_55, PV_56, PV_57, PV_58, PV_61, PV_62, PV_63, PV_64, PV_65, PV_66, PV_67, PV_68, PV_71, PV_72, PV_73, PV_74, PV_75, PV_76, PV_77, PV_78, PV_81, PV_82, PV_83, PV_84, PV_85, PV_86, PV_87, PV_88, PV_91, PV_92, PV_93, PV_94, PV_95, PV_96, PV_97, PV_98, PV_A1, PV_A2, PV_A3, PV_A4, PV_A5, PV_A6, PV_A7, PV_A8, PV_B1, PV_B2, PV_B3, PV_B4, PV_B5, PV_B6, PV_B7, PV_B8, PV_C1, PV_C2, PV_C3, PV_C4, PV_C5, PV_C6, PV_C7 and PV_C8.

In FIG. 4A and subsequent figures, each pixel value may correspond to each pixel at the same position or location, and may include a grayscale value, a luminance value and/or a brightness value of each pixel. For example, the pixel value PV_11 may correspond to the pixel P11 in FIG. 3, and the pixel P11 may have the pixel value PV_11, and may emit light based on the pixel value PV_11.

Referring to FIG. 4B, an example of a panel map PMAP_P that corresponds to the display panel 360 of FIG. 3 and a set of panel map data is illustrated. Herein, it is to be understood that the terms "panel map" and "panel map data" are interchangeably used.

The panel map PMAP_P may include a plurality of offset values POV_11, POV_12, POV_13, POV_14, POV_15, POV_16, POV_17, POV_18, POV_21, POV_22, POV_23, POV_24, POV_25, POV_26, POV_27, POV_28, POV_31, POV_32, POV_33, POV_34, POV_35, POV_36, POV_37, POV_38, POV_41, POV_42, POV_43, POV_44, POV_45, POV_46, POV_47, POV_48, POV_51, POV_52, POV_53, POV_54, POV_55, POV_56, POV_57, POV_58, POV_61, POV_62, POV_63, POV_64, POV_65, POV_66, POV_67, POV_68, POV_71, POV_72, POV_73, POV_74, POV_75, POV_76, POV_77, POV_78, POV_81, POV_82, POV_83, POV_84, POV_85, POV_86, POV_87, POV_88, POV_91, POV_92, POV_93, POV_94, POV_95, POV_96, POV_97, POV_98, POV_A1, POV_A2, POV_A3, POV_A4, POV_A5, POV_A6, POV_A7, POV_A8, POV_B1, POV_B2, POV_B3, POV_B4, POV_B5, POV_B6, POV_B7, POV_B8, POV_C1, POV_C2, POV_C3, POV_C4, POV_C5, POV_C6, POV_C7 and POV_C8.

In an of FIG. 4B, each offset value may correspond to each pixel at the same position or location, and may be used to compensate the pixel value of each pixel. For example, the offset value POV_11 may correspond to the pixel P11 in FIG. 3, and may be used to compensate the pixel value PV_11 corresponding to the pixel P11. Since each offset value in FIG. 4B corresponds to a respective one pixel, each offset value in FIG. 4B may be referred to as a pixel offset value.

In some embodiments, each offset value may be set or determined within a predetermined range. For example, each offset value may be set to be greater than or equal to the minimum offset value, and may be set to be less than or equal to the maximum offset value. For example, each offset value may be a positive integer, zero or negative integer, and may be less than or equal to X and greater than or equal to −Y, where each of X and Y is a positive integer.

In some embodiments, at least one of the minimum offset value and the maximum offset value may be changeable or variable. For example, the predetermined range for each offset value may be set differently for each display system (e.g., for each product). In other words, the granularity of the panel map PMAP_P may be set differently.

Referring to FIG. 4C, one compensated frame image CFIMG is displayed on the display panel 360 of FIG. 3 based on a set of compensated frame data. The compensate frame image CFIMG is obtained by performing the display panel compensation on the frame image FIMG of FIG. 4A is illustrated.

The compensated frame image CFIMG may include a plurality compensated pixel values CPV_11, CPV_12, CPV_13, CPV_14, CPV_15, CPV_16, CPV_17, CPV_18, CPV_21, CPV_22, CPV_23, CPV_24, CPV_25, CPV_26, CPV_27, CPV_28, CPV_31, CPV_32, CPV_33, CPV_34, CPV_35, CPV_36, CPV_37, CPV_38, CPV_41, CPV_42, CPV_43, CPV_44, CPV_45, CPV_46, CPV_47, CPV_48, CPV_51, CPV_52, CPV_53, CPV_54, CPV_55, CPV_56, CPV_57, CPV_58, CPV_61, CPV_62, CPV_63, CPV_64, CPV_65, CPV_66, CPV_67, CPV_68, CPV_71, CPV_72, CPV_73, CPV_74, CPV_75, CPV_76, CPV_77, CPV_78, CPV_81, CPV_82, CPV_83, CPV_84, CPV_85, CPV_86, CPV_87, CPV_88, CPV_91, CPV_92, CPV_93, CPV_94, CPV_95, CPV_96, CPV_97, CPV_98, CPV_A1, CPV_A2, CPV_A3, CPV_A4, CPV_A5, CPV_A6, CPV_A7, CPV_A8, CPV_B1, CPV_B2, CPV_B3, CPV_B4, CPV_B5, CPV_B6, CPV_B7, CPV_B8, CPV_C1, CPV_C2, CPV_C3, CPV_C4, CPV_C5, CPV_C6, CPV_C7 and CPV_C8.

In some embodiments, the compensated frame image CFIMG may be obtained by performing the display panel compensation on the frame image FIMG of FIG. 4A based on the panel map PMAP_P of FIG. 4B. For example, the compensated pixel value CPV_11 may be obtained by compensating the pixel value PV_11 based on the offset value POV_11. For example, the compensated pixel value CPV_11 may be obtained by adding the offset value POV_11 to the pixel value PV_11 (e.g., CPV_11=PV_11+POV_11).

In some embodiments, when the display panel compensation is performed on the plurality of pixel values included in the frame image FIMG of FIG. 4A based on the plurality of offset values included in the panel map PMAP_P of FIG. 4B, the plurality of pixels and the plurality of pixel values may be compensated based on different offset values. For example, the compensated pixel value CPV_11 may be obtained by compensating the pixel value PV_11 based on the offset value POV_11, and the compensated pixel value CPV_21 may be obtained by compensating the pixel value PV_21 based on the offset value POV_21. In other words, the display panel compensation may be performed in units of pixels.

In other embodiments, the panel map may include gain values rather than offset values, and each compensated pixel value may be obtained by multiplying each pixel value by each gain value. Alternatively, the panel map may include both offset values and gain values.

Referring to FIG. 4D, another example of a panel map PMAP_B that corresponds to the display panel 360 of FIG. 3 and a set of panel map data is illustrated. The descriptions repeated with FIG. 4B will be omitted.

The panel map PMAP_B may include a plurality of offset values BOV_11, BOV_12, BOV_13, BOV_14, BOV_15, BOV_16, BOV_17, BOV_18, BOV_21, BOV_22, BOV_23, BOV_24, BOV_25, BOV_26, BOV_27, BOV_28, BOV_31, BOV_32, BOV_33, BOV_34, BOV_35, BOV_36, BOV_37, BOV_38, BOV_41, BOV_42, BOV_43, BOV_44, BOV_45, BOV_46, BOV_47, BOV_48, BOV_51, BOV_52, BOV_53, BOV_54, BOV_55, BOV_56, BOV_57, BOV_58, BOV_61, BOV_62, BOV_63, BOV_64, BOV_65, BOV_66, BOV_67 and BOV_68.

In an of FIG. 4D, the plurality of pixels included in the display panel 360 of FIG. 3 may be grouped into a plurality of blocks such that each of the plurality of blocks includes two or more of the plurality of pixels. Each offset value may correspond to each block at the same position or location, and may be used to compensate the pixel values of the pixels included in each block. For example, two pixels may form one block, and the offset value BOV_11 may correspond to a block including the pixels P11 and P21 in FIG. 3, and may be used to compensate the pixel values PV_11 and PV_21 corresponding to the pixels P11 and P21. Since each offset value in FIG. 4D corresponds to one block, each offset value in FIG. 4D may be referred to as a block offset value. The block offset value in FIG. 4D may be substantially the same as the pixel offset value in FIG. 4B, except that the block offset value corresponds to one block rather than one pixel.

In some embodiments, the compensated frame image CFIMG of FIG. 4C may be obtained by performing the display panel compensation on the frame image FIMG of FIG. 4A based on the panel map PMAP_B of FIG. 4D. When the display panel compensation is performed on the plurality of pixel values included in the frame image FIMG of FIG. 4A based on the plurality of offset values included in the panel map PMAP_B of FIG. 4D, the plurality of blocks may be compensated based on different offset values, and pixel values included in the same block may be compensated based on the same offset value. For example, the compensated pixel values CPV_11 and CPV_21 may be obtained by compensating the pixel values PV_11 and PV_21 based on the offset value BOV_11, and the compensated pixel values CPV_31 and CPV_41 may be obtained by compensating the pixel values PV_31 and PV_41 based on the offset value BOV_21. In other words, the display panel compensation may be performed in units of blocks.

Figure 4E:
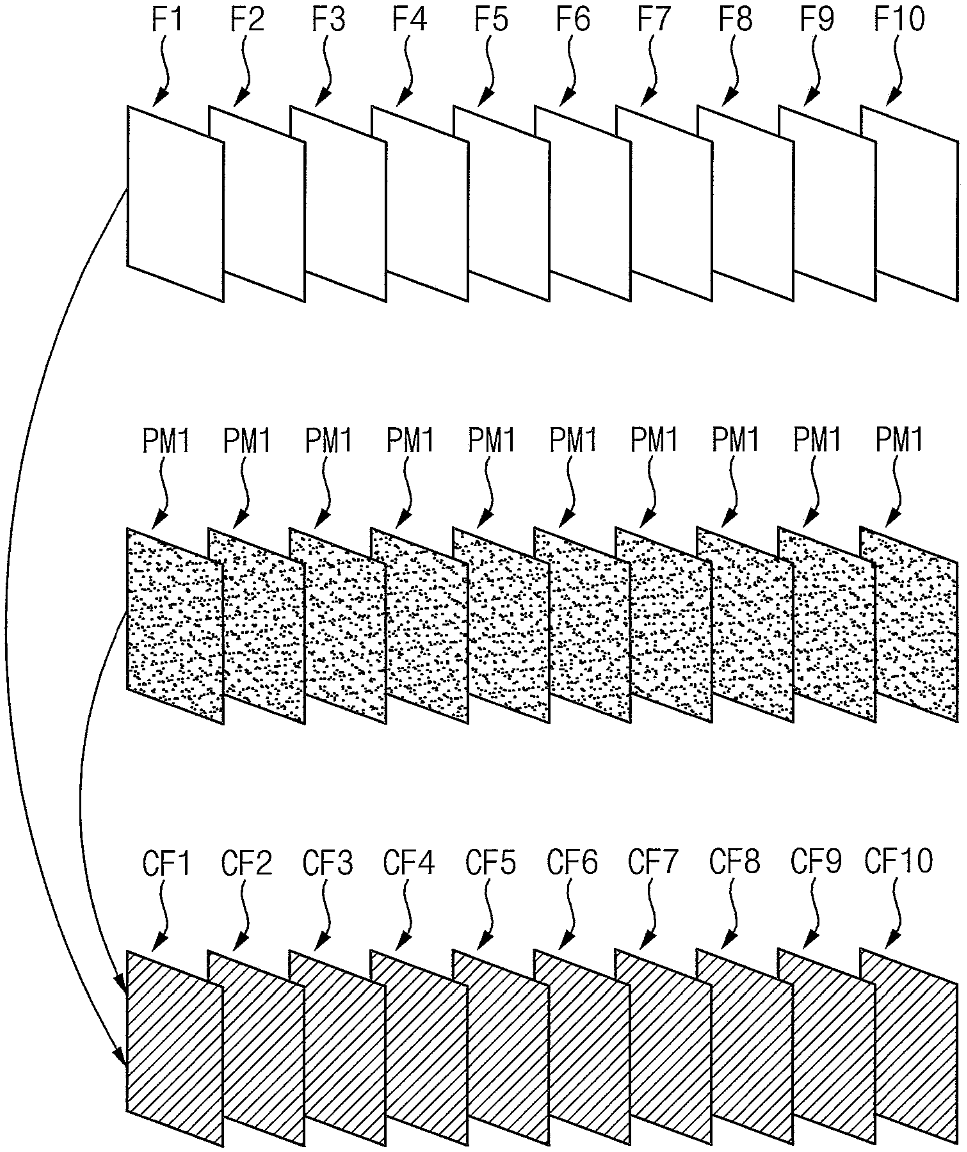

Referring to FIG. 4E, an example in which a plurality of frame images displayed on the display panel 360 are sequentially generated based on the frame data FDAT, the panel map data PMAP and the compensated frame data CFDAT is illustrated.

In FIG. 4E, each of frame images F1, F2, F3, F4, F5, F6, F7, F8, F9 and F10 may correspond to the frame data FDAT, and may correspond to the frame image FIMG of FIG. 4A. A panel map PM1 may correspond to the panel map data PMAP, and may correspond to the panel map PMAP_P of FIG. 4B or the panel map PMAP_B of FIG. 4D. Each of compensated frame images CF1, CF2, CF3, CF4, CF5, CF6, CF7, CF8, CF9 and CF10 may correspond to the compensated frame data CFDAT, and may correspond to the compensated frame image CFIMG of FIG. 4C.

In an of FIG. 4E, the panel map PM1 stored in the second memory 210 may be read and transmitted to the panel compensator 222 for each frame (or every frame), and the panel compensator 222 may perform the display panel compensation based on the panel map PM1. For example, the same panel map PM1 may be applied to all of the frames F1 to F10.

FIGS. 5, 6, 7, 8 and 9 are block diagrams illustrating examples of a display system of FIG. 1. The descriptions duplicate with those of FIG. 2 will be omitted.

Figure 5:
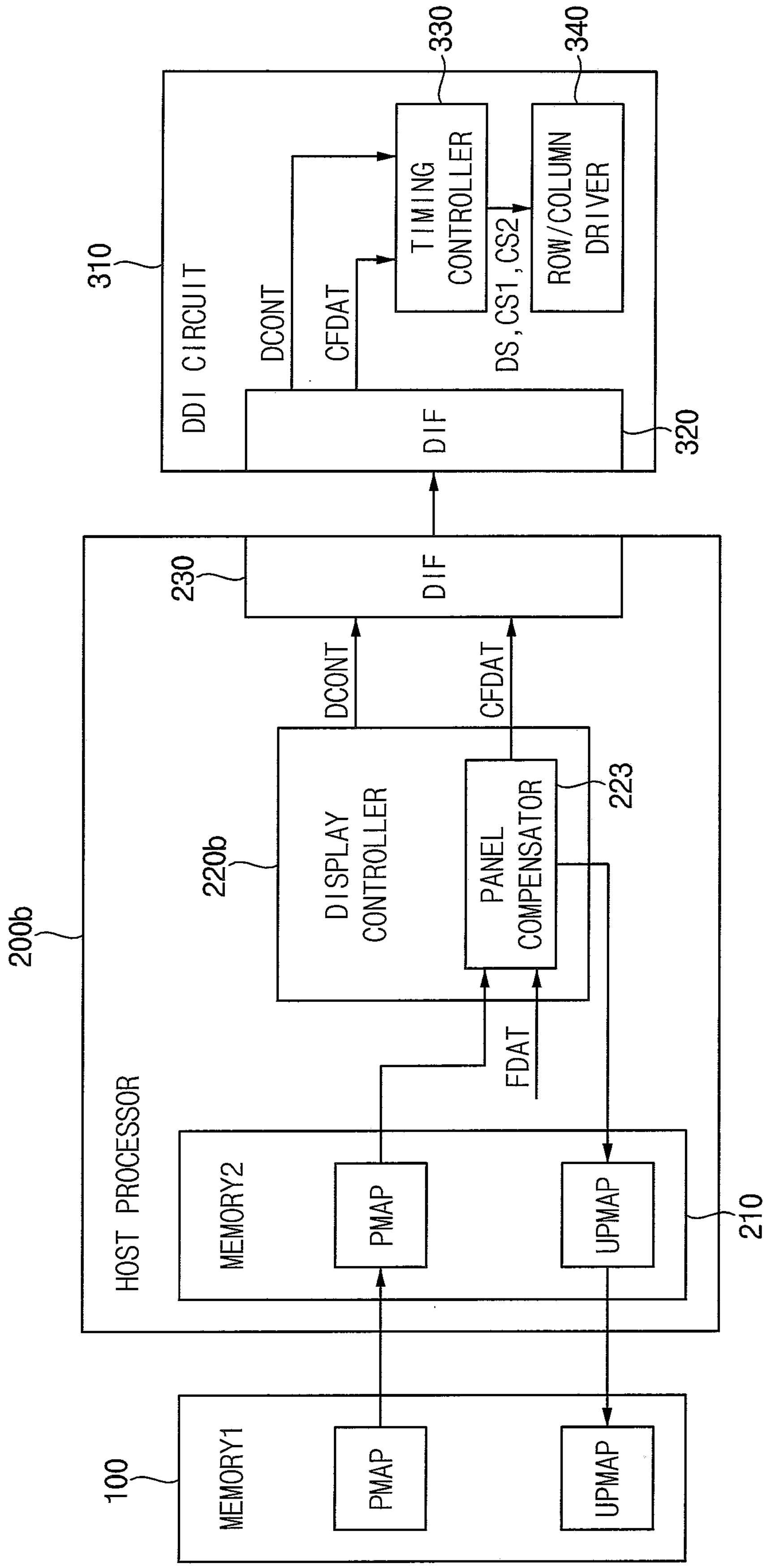
FIGS. 5, 6, 7, 8 and 9 are block diagrams illustrating examples of a display system of FIG. 1, according to embodiments.

Referring to FIG. 5, a display system 10*b* includes a first memory 100, a host processor 200*b* and a display driver integrated circuit 310. The host processor 200*b* may include a second memory 210, a display controller 220*b* and a display interface 230. The display controller 220*b* may include a panel compensator 223.

The display system 10*b* may be substantially the same as the display system 10*a* of FIG. 2, except that a configuration and an operation of the panel compensator 223 are partially changed.

As with the panel compensator 222 in FIG. 2, the panel compensator 223 may generate the compensated frame data CFDAT by compensating the frame data FDAT based on the plurality of offset values included in the panel map data PMAP. Each frame data FDAT may include the plurality of pixel values, each compensated frame data CFDAT may include the plurality of compensated pixel values, and the plurality of compensated pixel values may be generated by compensating the plurality of pixel values based on the plurality of offset values.

In addition, the panel compensator 223 may periodically (or regularly) generate updated panel map data UPMAP based on the frame data FDAT or the compensated frame data CFDAT. The updated panel map data UPMAP may be different from the panel map data PMAP. For example, the panel map data PMAP may be referred to as initial panel map data to be distinguished from the updated panel map data UPMAP.

The second memory 210 may periodically receive the updated panel map data UPMAP from the panel compensator 223, and may periodically store the updated panel map data UPMAP. For example, the updated panel map data UPMAP may be written in the second memory 210 through a direct memory access of the display controller 220*b*. For example, the host processor 200*b* may periodically transmit the updated panel map data UPMAP to the first memory 100. For example, the first memory 100 may periodically receive the updated panel map data UPMAP from the host processor 200*b*, and may periodically store the updated panel map data UPMAP.

The updated panel map data UPMAP may be implemented in substantially the same form as the panel map data PMAP. For example, when the panel map data PMAP includes the plurality of offset values for the plurality of pixels and each offset value corresponds to a respective one pixel as illustrated in FIG. 4B, the updated panel map data UPMAP may also include a plurality of offset values for the plurality of pixels. For another example, when the panel map data PMAP includes the plurality of offset values for the plurality of blocks and each offset value corresponds to a respective one block and respective two or more pixels as illustrated in FIG. 4D, the updated panel map data UPMAP may also include a plurality of offset values for the plurality of blocks.

In some embodiments, the updated panel map data UPMAP may include information associated with or related to the usage of the display panel 360. For example, when the display panel 360 is an organic light emitting display panel including an organic light emitting diode, the display panel 360 may have a characteristic of being differently deteriorated (e.g., burn-in) for each pixel depending on the amount of usage. To compensate the above-described deterioration, an algorithm in which pixel values actually transmitted to and displayed on the display panel 360 are periodically received, and the updated panel map data UPMAP is periodically generated for updating the panel map may be applied.

In other words, the panel compensator 223 may periodically update the panel map by continuously monitoring a display status of the display panel 360 such that deterioration due to the amount of usage of the display panel 360 is predicted. An operation of periodically collecting the updated data in real-time may be implemented both in software and hardware. For example, a panel map that reflects a usage pattern of a user may be generated in software and in background, and an existing panel map may be updated based on the generated panel map.

In some embodiments, after the panel compensator 223 generates the updated panel map data UPMAP, and the second memory 210 stores the updated panel map data UPMAP, the panel compensator 223 may perform the display panel compensation based on the panel map data PMAP and the updated panel map data UPMAP. In other words, the updated panel map may be adaptively applied to the display panel compensation for compensating the deterioration.

In some embodiments, a first period or cycle in which the panel compensator 223 periodically generates the updated panel map data UPMAP and the second memory 210 periodically stores the updated panel map data UPMAP may be different from a second period or cycle in which the first memory 100 periodically stores the updated panel map data UPMAP. For example, the second period may be longer than the first period.

In other embodiments, the first memory 100 may aperiodically (or irregularly) receive and store the updated panel map data UPMAP (e.g., when the display system 10*b* is powered off).

Figure 6:
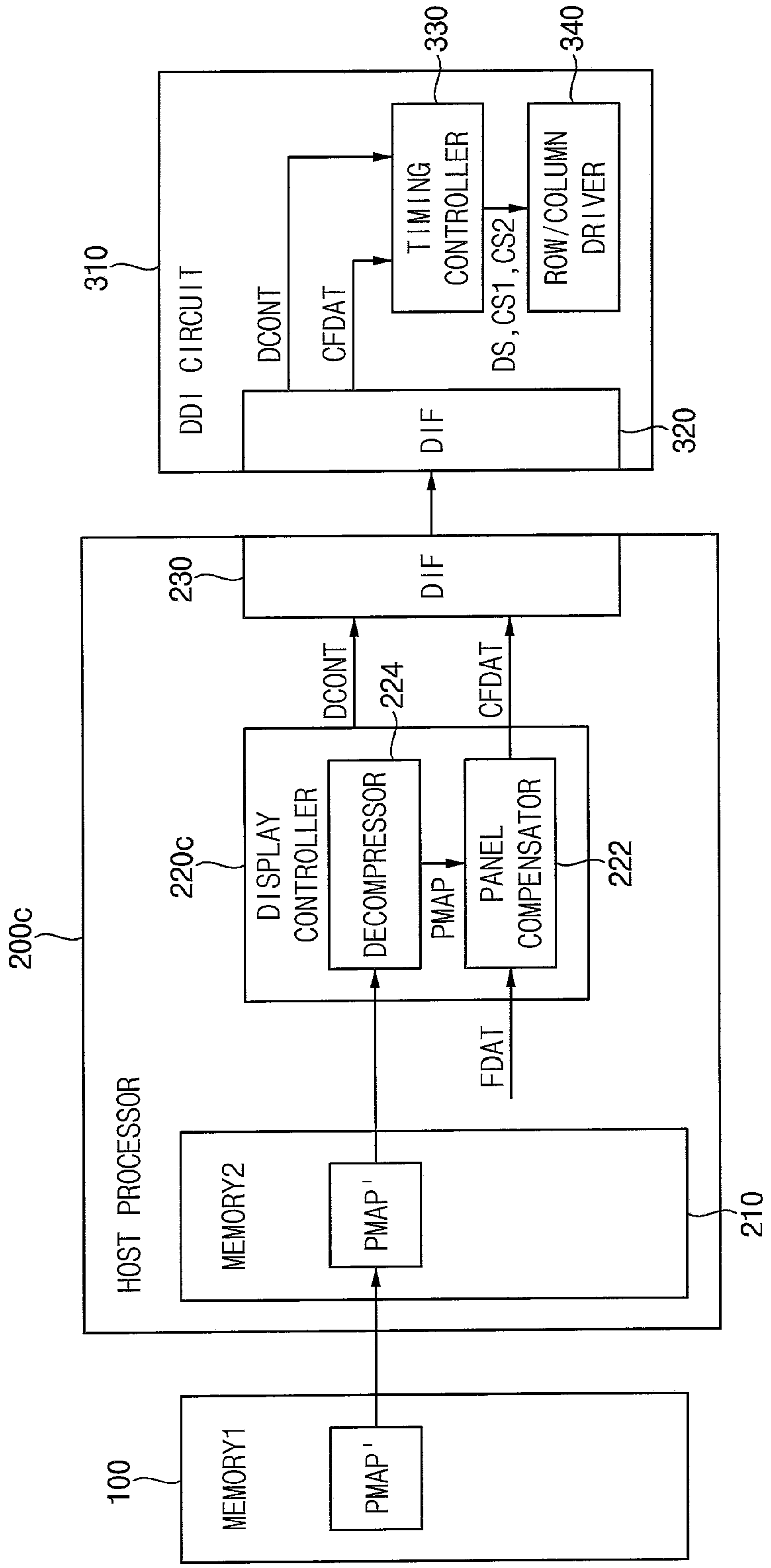

Referring to FIG. 6, a display system 10*c* includes a first memory 100, a host processor 200*c* and a display driver integrated circuit 310. The host processor 200*c* may include a second memory 210, a display controller 220*c* and a display interface 230. The display controller 220*c* may include a panel compensator 222 and a decompressor 224.

The display system 10*c* may be substantially the same as the display system 10*a* of FIG. 2, except that the first and second memories 100 and 210 store at least one set of compressed panel map data PMAP' and the display controller 220*c* further includes the decompressor 224.

Each of the first and second memories 100 and 210 may store the compressed panel map data PMAP' in which the panel map data PMAP is compressed. To reduce or save the usage of a memory bandwidth when reading the panel map data stored in the second memory 210, the panel map data PMAP may be compressed and the compressed panel map data PMAP' may be stored in the first and second memories 100 and 210. In addition, the panel map data may generally have high locality, and thus, the power loss may be reduced or minimized when the panel map data is compressed.

In some embodiments, the panel map data PMAP may be compressed using at least one of various compression and/or coding schemes. For example, lossy compression schemes and/or lossless compression schemes may be used. For example, the lossy compression schemes may be performed by a spatial transform and a quantization in which various values are grouped into discrete values. For example, the spatial transform may include discrete cosine transform (DCT), wavelet transform, or the like. For example, the quantization may include scalar quantization, vector quantization, or the like. For example, in a case of adopting the wavelet transform, embedded quantization, such as embedded zerotrees wavelet algorithm (EZW), set partitioning in hierarchical trees (SPIRT), embedded zeroblock coding (EZBC), or the like, may be used. For example, at least one of various coding schemes, such as JPEG (Joint Photographic Experts Group), MPEG (Moving Picture Expert Group), H.264, HEVC (High Efficiency Video Coding), or the like, may be used. For example, the lossless compression schemes may be implemented based on arithmetic coding such as context-adaptive binary arithmetic coding (CABAC), variable length coding such as context-adaptive variable-length coding (CAVLC), or the like.

The decompressor 224 may receive the compressed panel map data PMAP' stored in the second memory 210, may generate the panel map data PMAP by decompressing the compressed panel map data PMAP', and may provide the panel map data PMAP to the panel compensator 222.

The panel compensator 222 may be substantially the same as the panel compensator 222 in FIG. 2, and may perform the display panel compensation based on the panel map data PMAP.

Figure 7:
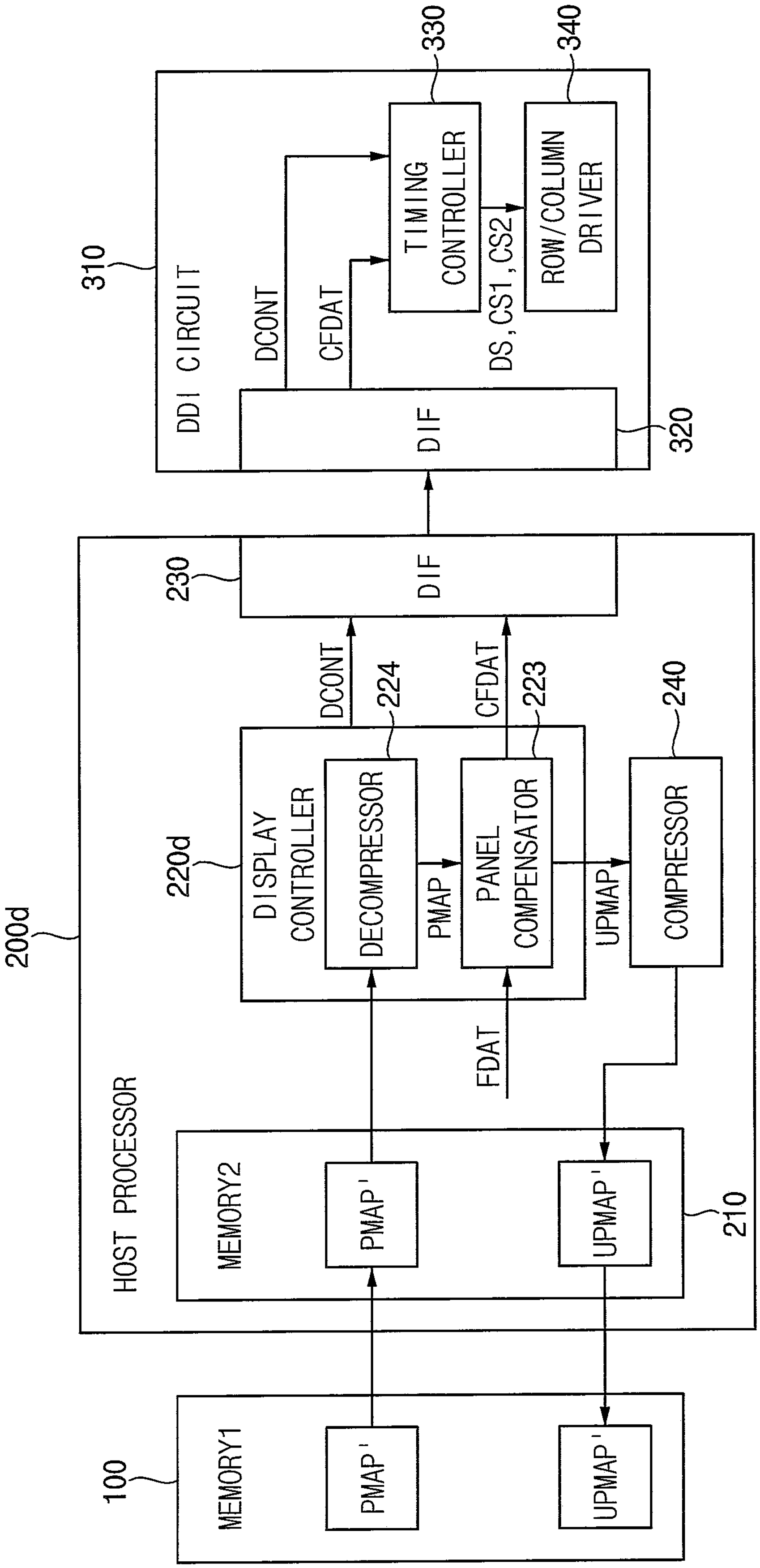

Referring to FIG. 7, a display system 10*d* includes a first memory 100, a host processor 200*d* and a display driver integrated circuit 310. The host processor 200*d* may include a second memory 210, a display controller 220*d*, a display interface 230 and a compressor 240. The display controller 220*d* may include a panel compensator 223 and a decompressor 224.

The display system 10*d* may be substantially the same as the display system 10*c* of FIG. 6, except that a configuration and an operation of the panel compensator 223 are partially changed, and the host processor 200*d* further includes the compressor 240.

The panel compensator 223 may be substantially the same as the panel compensator 223 in FIG. 5, and may periodically generate the updated panel map data UPMAP.

The compressor 240 may generate compressed updated panel map data UPMAP' by compressing the updated panel map data UPMAP. The second memory 210 may periodically receive the compressed updated panel map data UPMAP' from the compressor 240, and may periodically store the compressed updated panel map data UPMAP'. In addition, the first memory 100 may periodically receive the compressed updated panel map data UPMAP' from the host processor 200*d*, and may periodically store the compressed updated panel map data UPMAP'. To reduce or save the usage of a memory bandwidth when storing the updated panel map data in the second memory 210, the updated panel map data UPMAP may be compressed and the compressed updated panel map data UPMAP' may be stored.

In some embodiments, the compressor 240 may be disposed inside the display controller 220*d*.

Figure 8:
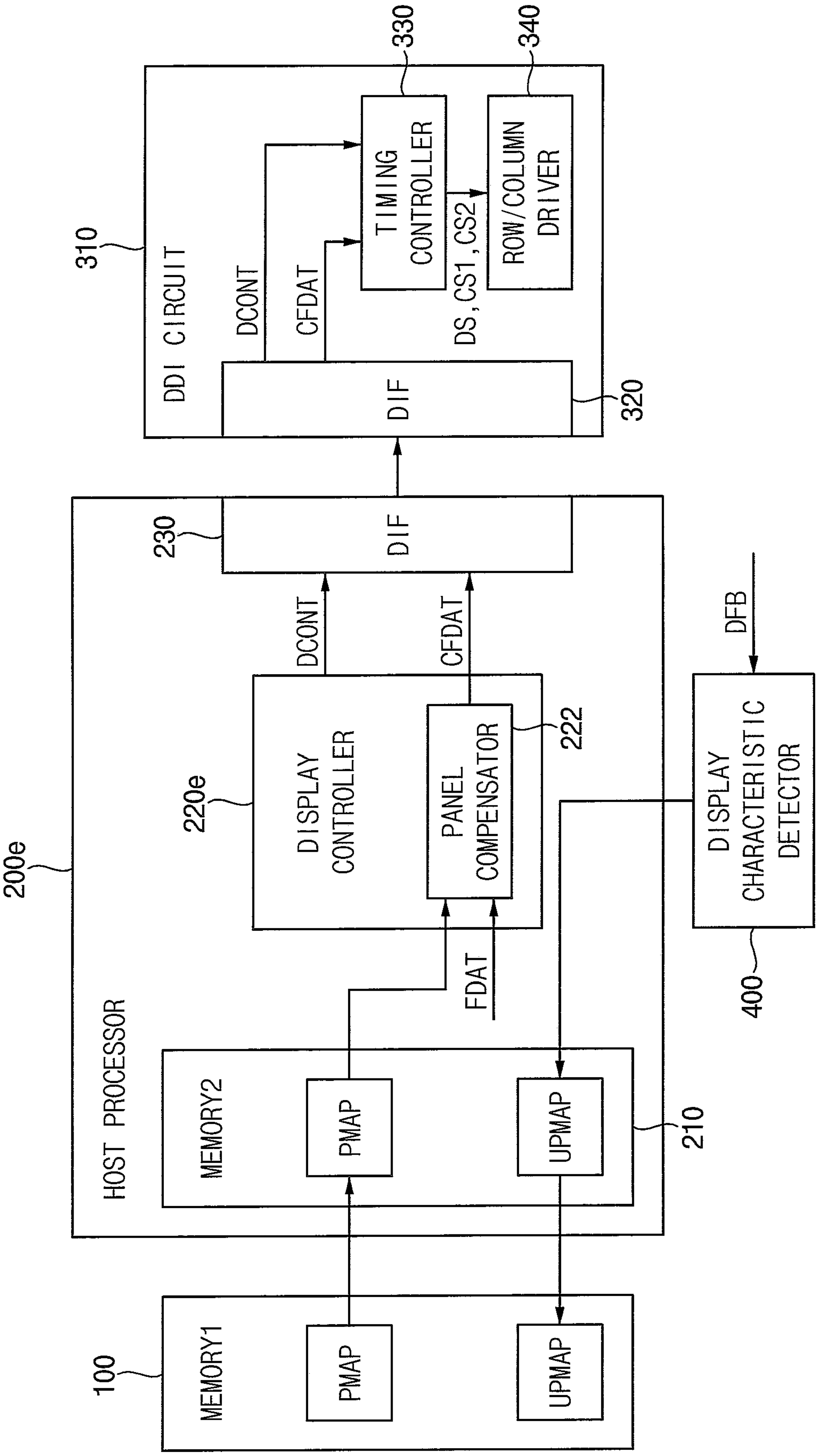

Referring to FIG. 8, a display system 10*e* includes a first memory 100, a host processor 200*e*, a display driver integrated circuit 310 and a display characteristic detector 400. The host processor 200*e* may include a second memory 210, a display controller 220*e* and a display interface 230. The display controller 220*e* may include a panel compensator 222.

The display system 10*e* may be substantially the same as the display system 10*b* of FIG. 5, except that the display characteristic detector 400 that is disposed outside the host processor 200*e* generates the updated panel map data UPMAP.

The display characteristic detector 400 may receive a display feedback signal DFB from the display panel 360, and may periodically generate the updated panel map data UPMAP by analyzing a characteristic of the display panel 360 based on the display feedback signal DFB. The updated panel map data UPMAP may be different from the panel map data PMAP. For example, the deterioration of the display panel 360 may be periodically checked by the display characteristic detector 400 continuously monitoring the characteristic of the display panel 360, and the panel map may be periodically updated based thereon.

In some embodiments, as described with reference to FIGS. 6 and 7, the host processor 200*e* may further include the decompressor 224 and/or the compressor 240, and the panel map data PMAP and/or the updated panel map data UPMAP may be compressed and stored.

Figure 9:
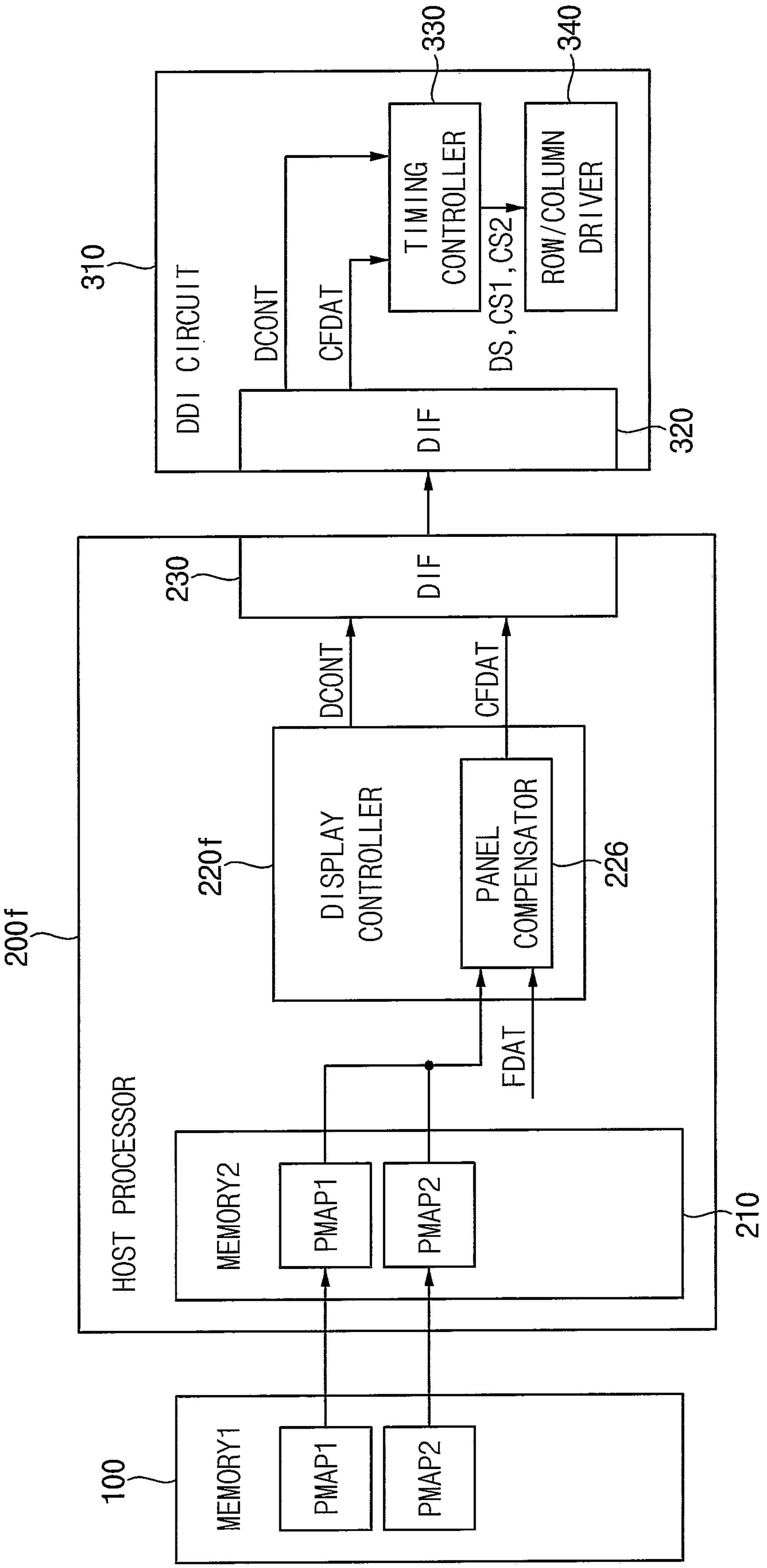

Referring to FIG. 9, a display system 10*f* includes a first memory 100, a host processor 200*f* and a display driver integrated circuit 310. The host processor 200*f* may include a second memory 210, a display controller 220*f* and a display interface 230. The display controller 220*f* may include a panel compensator 226.

The display system 10*f* may be substantially the same as the display system 10*a* of FIG. 2, except that the display panel compensation is performed based on two panel maps.

The first memory 100 may store a set of first panel map data PMAP1 and a set of second panel map data PMAP2. The second memory 210 may store the first and second panel map data PMAP1 and PMAP2 loaded from the first memory 100. The panel compensator 226 may perform the display panel compensation based on the first and second panel map data PMAP1 and PMAP2. For example, at least some of a plurality of frame data may be compensated based on different panel map data.

The first and second panel map data PMAP1 and PMAP2 may be implemented in substantially the same form. For example, each of the first and second panel map data PMAP1 and PMAP2 may include a plurality of offset values for the plurality of pixels or the plurality of blocks.

Figure 10:
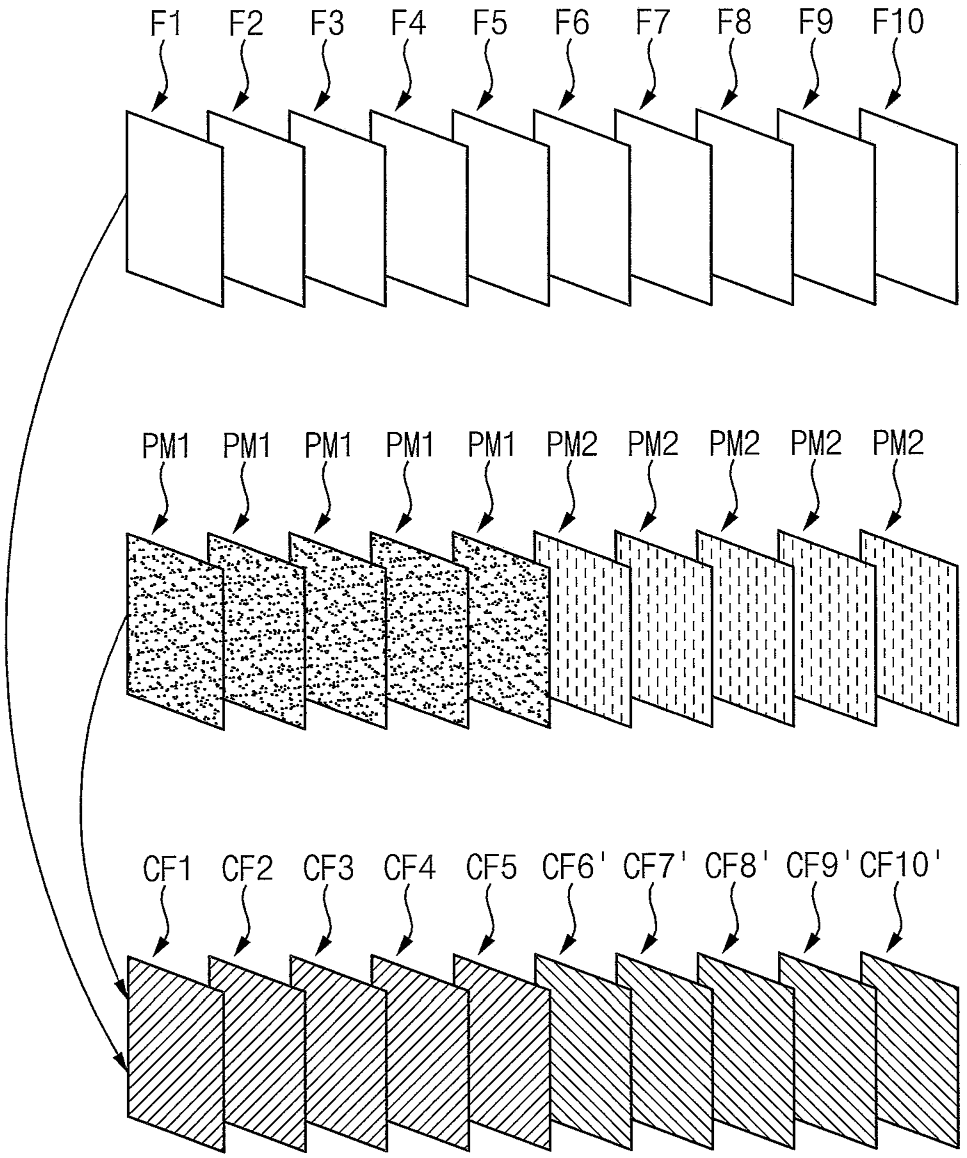
FIG. 10 is a diagram for describing an operation of a display system, according to embodiments.

FIG. 10 is a diagram for describing an operation of a display system according to embodiments. An operation of FIG. 10 will be described based on the display system 10*f* of FIG. 9. The descriptions repeated with FIG. 4E will be omitted.

Referring to FIG. 10, an example in which a plurality of frame images to be displayed on the display panel 360 are sequentially generated based on the frame data FDAT, the first and second panel map data PMAP1 and PMAP2 and the compensated frame data CFDAT is illustrated. In FIG. 10, a panel map PM1 may correspond to the first panel map data PMAP1, and a panel map PM2 may correspond to the second panel map data PMAP2.

In an of FIG. 10, one of the panel maps PM1 and PM2 stored in the second memory 210 may be read and transmitted to the panel compensator 226 for each frame (or every frame), and the panel compensator 226 may perform the display panel compensation based on one of the panel maps PM1 and PM2. For example, different panel maps PM1 and PM2 may be applied to some of the frames F1 to F10. For example, the compensated frame images CF1, CF2, CF3, CF4 and CF5 may be obtained by performing the display panel compensation on the frame images F1, F2, F3, F4 and F5 based on the panel map PM1. For example, compensated frame images CF6', CF7', CF8', CF9' and CF10' may be obtained by performing the display panel compensation on the frame images F6, F7, F8, F9 and F10 based on the panel map PM2.

Figure 11:
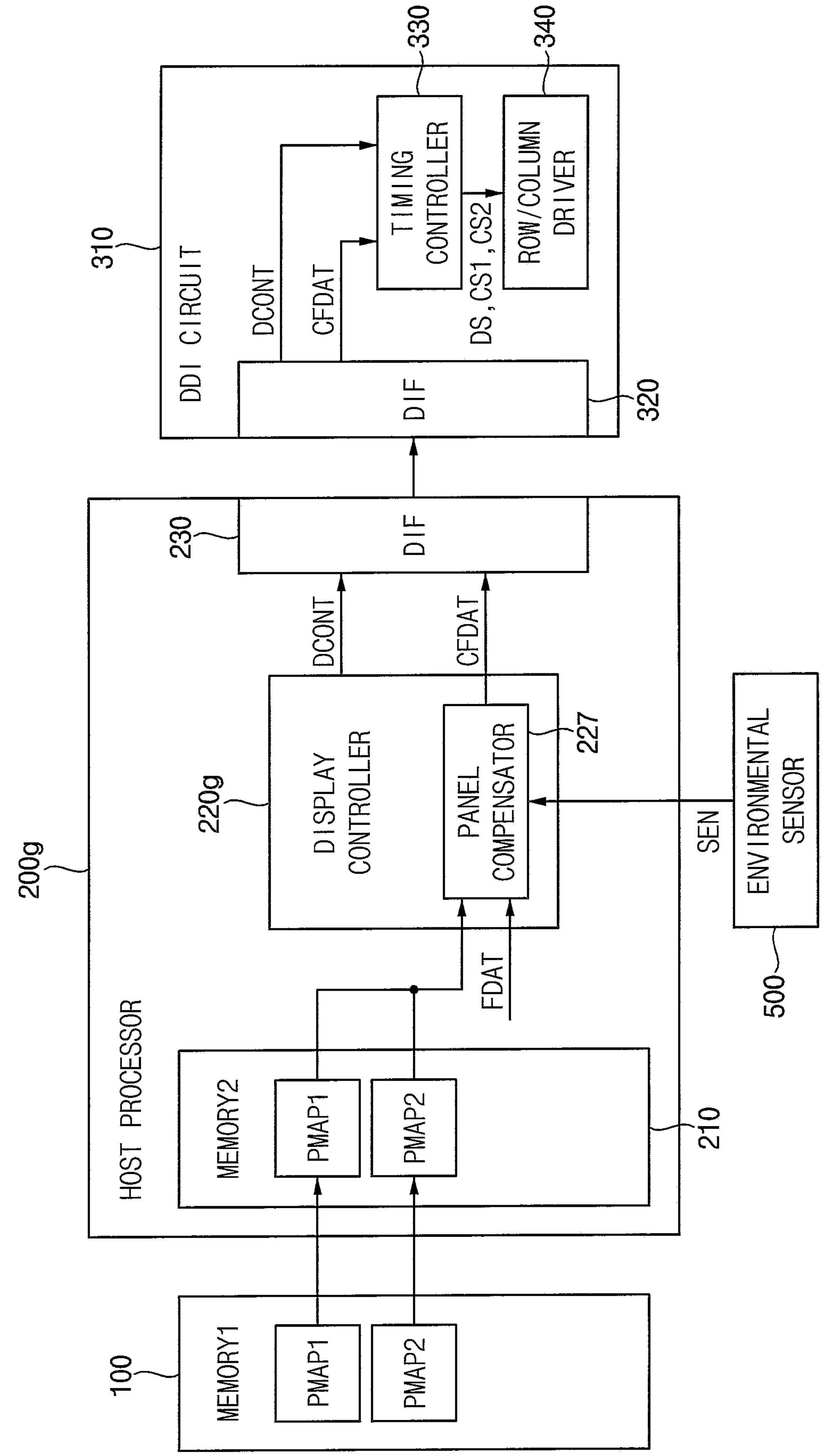
FIGS. 11 and 12 are block diagrams illustrating examples of a display system of FIG. 1, according to embodiments.
Figure 12:
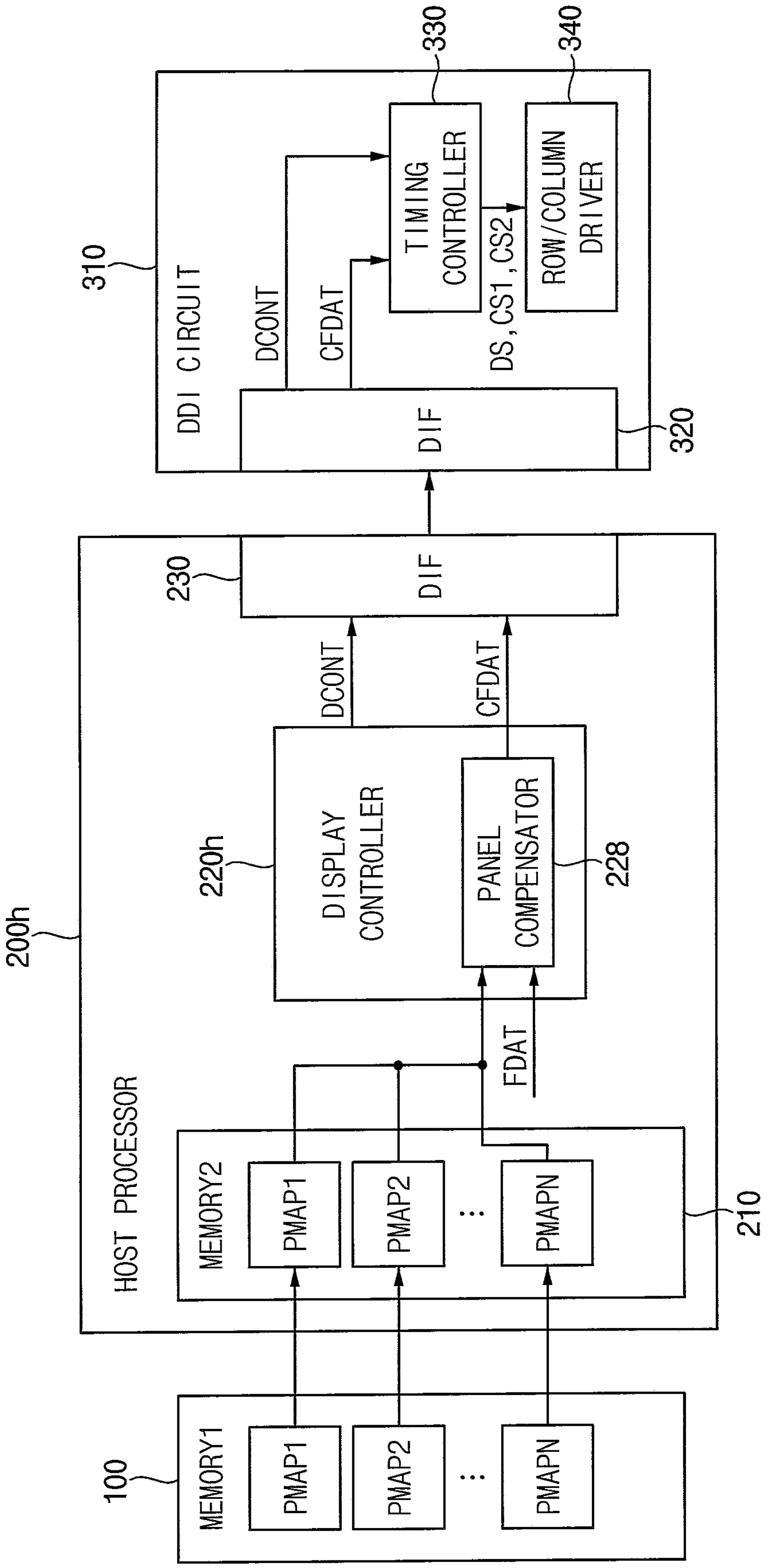

FIGS. 11 and 12 are block diagrams illustrating examples of a display system of FIG. 1. The descriptions repeated with FIGS. 2 and 9 will be omitted.

Referring to FIG. 11, a display system 10*g* includes a first memory 100, a host processor 200*g*, a display driver integrated circuit 310 and an environmental sensor 500. The host processor 200*g* may include a second memory 210, a display controller 220*g* and a display interface 230. The display controller 220*g* may include a panel compensator 227.

The display system 10*g* may be substantially the same as the display system 10*f* of FIG. 9, except that the display system 10*g* further includes the environmental sensor 500, and a configuration and an operation of the panel compensator 227 are partially changed.

The environmental sensor 500 may obtain environment information about a surrounding environment (or operating environment) in which the display system 10*g* is driven, and may generate a sensing signal SEN based on the environment information. For example, the environmental sensor 500 may activate the sensing signal SEN when the surrounding environment changes to out of a predetermined reference range.

In some embodiments, the environmental sensor 500 may include at least one of a temperature sensor, a humidity sensor, a pressure sensor, a motion sensor, a temporal sensor, a spatial sensor, an illumination sensor, an acceleration sensor, a vibration sensor, a mechanical stress sensor and a shock sensor. In other words, the surrounding environment may include at least one of temperature, humidity, pressure, motion, time, space, illuminance, acceleration, vibration, mechanical stress and shock. However, embodiments are not limited thereto, and the environmental sensor 500 may further include at least one sensor that collects environment information, such as an external force sensor, a radiation sensor, a dust sensor, an electrical stress sensor, or the like.

The panel compensator 227 may perform the display panel compensation based on the first and second panel map data PMAP1 and PMAP2 and the sensing signal SEN. For example, at least some of the plurality of frame data may be compensated based on different panel map data depending on the sensing signal SEN. For example, in a high-illuminance environment (e.g., an outdoor environment) in which an illuminance is higher than a reference illuminance, the display panel compensation may be performed based on the first panel map data PMAP1. For example, in a low-illuminance environment (e.g., an indoor environment) in which the illuminance is lower than or equal to the reference illumination, the display panel compensation may be performed based on the second panel map data PMAP2.

Referring to FIG. 12, a display system 10*h* includes a first memory 100, a host processor 200*h* and a display driver integrated circuit 310. The host processor 200*h* may include a second memory 210, a display controller 220*h* and a display interface 230. The display controller 220*h* may include a panel compensator 228.

The display system 10*h* may be substantially the same as the display system 10*f* of FIG. 9, except that the display panel compensation is performed based on N panel maps where N is a natural number greater than or equal to three.

The first memory 100 may store first to N-th panel map data PMAP1, PMAP2, . . . , PMAPN. The second memory 210 may store the first to N-th panel map data PMAP1 to PMAPN loaded from the first memory 100. The panel compensator 228 may perform the display panel compensation based on the first to N-th panel map data PMAP1 to PMAPN. For example, at least some of the plurality of frame data may be compensated based on different panel map data.

In some embodiments, one frame data may be compensated based on two or more panel map data. In other words, a plurality of compensation functions may be performed on one frame data at once using a plurality of panel map data, and/or each compensation function may be applied to one frame data independently and individually.

In some embodiments as described with reference to FIGS. 5, 7 and 8, each of the display systems 10*f*, 10*g* and 10*h* of FIGS. 9, 11 and 12 may generate the updated panel map data. In some embodiments as described with reference to FIGS. 6 and 7, each of the display systems 10*f*, 10*g* and 10*h* of FIGS. 9, 11 and 12 may further include the decompressor 224 and/or the compressor 240, and the panel map data and/or the updated panel map data may be compressed and stored. In some embodiments, as described with reference to FIGS. 9, 11 and 12, each of the display systems 10*b*, 10*c*, 10*d* and 10*e* of FIGS. 5, 6, 7 and 8 may operate based on two or more panel maps.

Although embodiments are described based on a specific number of pixels, pixel values, offset values, frames and panel maps, embodiments are not limited thereto.

Figure 13:
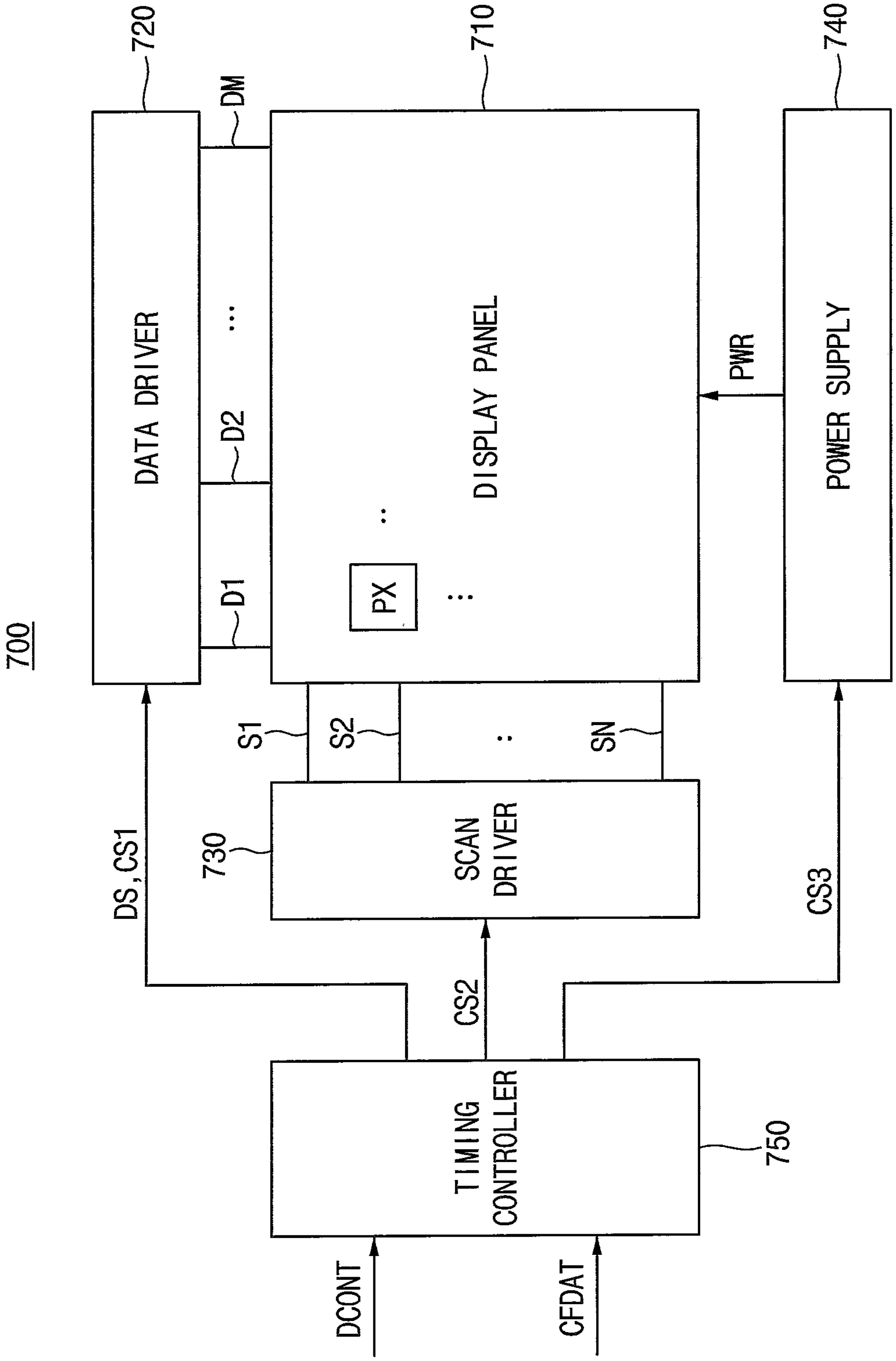
FIG. 13 is a block diagram illustrating an of a display device included in a display system, according to embodiments.

FIG. 13 is a block diagram illustrating an of a display device included in a display system according to embodiments.

Referring to FIG. 13, a display device 700 includes a display panel 710 and a display driver integrated circuit. The display driver integrated circuit may include a data driver 720, a scan driver 730, a power supply 740 and a timing controller 750.

The display panel 710 operates (e.g., displays an image) based on image data (e.g., based on frame data). The display panel 710 may be connected to the data driver 720 through a plurality of data lines D1, D2, . . . , DM, and may be connected to the scan driver 730 through a plurality of scan lines S1, S2, . . . , SN. The plurality of data lines D1, D2, . . . , DM may extend in a first direction, and the plurality of scan lines S1, S2, . . . , SN may extend in a second direction crossing (e.g., substantially perpendicular to) the first direction.

The display panel 710 may include a plurality of pixels PX that are arranged in a matrix form having a plurality of rows and a plurality of columns. For example, each of the plurality of pixels PX may include a light emitting element and at least one transistor for driving the light emitting element. For another example, each of the plurality of pixels PX may include a liquid crystal capacitor and at least one transistor for driving the liquid crystal capacitor. Each of the plurality of pixels PX may be electrically connected to a respective one of the plurality of data lines D1, D2, . . . , DM and a respective one of the plurality of scan lines S1, S2, . . . , SN. Examples of each pixel will be described with reference to FIGS. 14A and 14B.

The timing controller 750 may control overall operations of the display device 700. For example, the timing controller 750 may receive the display control signal DCONT from the host processor 200, and may provide predetermined control signals CS1, CS2 and CS3 to the data driver 720, the scan driver 730 and the power supply 740 based on the display control signal DCONT to control the operations of the display device 700. For example, the control signals CS1, CS2 and CS3 may include a vertical synchronization signal and a horizontal synchronization signal that are used inside the display device 700.

The timing controller 750 may receive the compensated frame data CFDAT to which the display panel compensation is applied from the host processor 200, and may generate a data signal DS for displaying an image based on the compensated frame data CFDAT. For example, the compensated frame data CFDAT may include red image data, green image data and blue image data. In addition, the compensated frame data CFDAT may include white image data. Alternatively, the compensated frame data CFDAT may include magenta image data, yellow image data, cyan image data, or the like.

The data driver 720 may generate a plurality of data voltages based on the control signal CS1 and the data signal DS, and may apply the plurality of data voltages to the display panel 710 through the plurality of data lines D1, D2, . . . , DM. For example, the data driver 720 may include a digital-to-analog converter (DAC) that converts the data signal DS in a digital form into the plurality of data voltages in an analog form.

The scan driver 730 may generate a plurality of scan signals based on the control signal CS2, and may apply the plurality of scan signals to the display panel 710 through the plurality of scan lines S1, S2, . . . , SN. The plurality of scan lines S1, S2, . . . , SN may be sequentially activated based on the plurality of scan signals.

In some embodiments, the timing controller 750 may correspond to the timing controller 330 in FIG. 2, and the data driver 720 and the scan driver 730 may correspond to the row/column driver 340 in FIG. 2.

In some embodiments, the data driver 720, the scan driver 730 and the timing controller 750 may be implemented as one integrated circuit. In other embodiments, the data driver 720, the scan driver 730 and the timing controller 750 may be implemented as two or more integrated circuits. A driving module including at least the timing controller 750 and the data driver 720 may be referred to as a timing controller embedded data driver (TED).

The power supply 740 may supply at least one power supply voltage PWR to the display panel 710 based on the control signal CS3.

In some embodiments, at least some of the elements included in the display driver integrated circuit may be disposed, e.g., directly mounted, on the display panel 710, or may be connected to the display panel 710 in a tape carrier package (TCP) type. Alternatively, at least some of the elements included in the display driver integrated circuit may be integrated on the display panel 710. In some embodiments, the elements included in the display driver integrated circuit may be respectively implemented with separate circuits/modules/chips. In other embodiments, on the basis of a function, some of the elements included in the display driver integrated circuit may be combined into one circuit/module/chip, or may be further separated into a plurality of circuits/modules/chips.

Although not illustrated in detail, the display device 700 may further include a frame buffer for storing frame data, a backlight unit, etc. depending on a type of the pixels PX, a driving scheme of the display panel 710, etc.

Figure 14A:
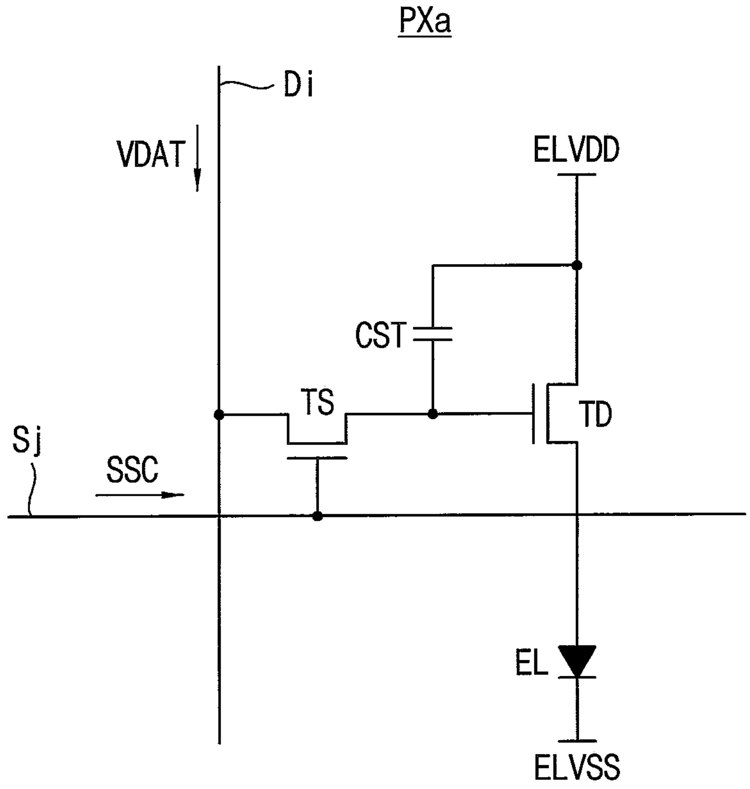
FIGS. 14A and 14B are circuit diagrams illustrating examples of a pixel included in a display panel included in a display device of FIG. 13, according to embodiments.
Figure 14B:
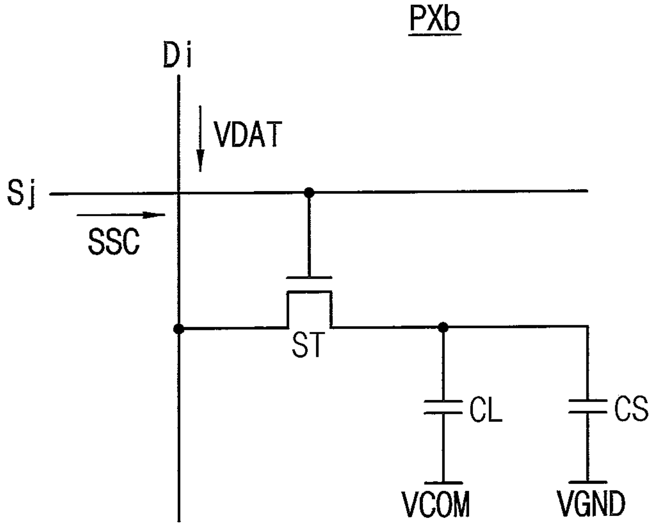

FIGS. 14A and 14B are circuit diagrams illustrating examples of a pixel included in a display panel included in a display device of FIG. 13.

Referring to FIG. 14A, each pixel PXa may include a switching transistor TS, a storage capacitor CST, a driving transistor TD and an organic light emitting diode EL.

The switching transistor TS may have a first electrode connected to a data line Di, a second electrode connected to the storage capacitor CST, and a gate electrode connected to a scan line Sj. The switching transistor TS may transfer a data voltage VDAT received from the data driver 720 to the storage capacitor CST in response to a scan signal SSC received from the scan driver 730.

The storage capacitor CST may have a first electrode connected to a first power supply voltage ELVDD and a second electrode connected to a gate electrode of the driving transistor TD. The storage capacitor CST may store the data voltage VDAT transferred through the switching transistor TS.

The driving transistor TD may have a first electrode connected to the first power supply voltage ELVDD, a second electrode connected to the organic light emitting diode EL, and the gate electrode connected to the storage capacitor CST. The driving transistor TD may be turned on or off depending on the data voltage VDAT stored in the storage capacitor CST.

The organic light emitting diode EL may have an anode electrode connected to the driving transistor TD and a cathode electrode connected to a second power supply voltage ELVSS. The organic light emitting diode EL may emit light based on a current flowing from the first power supply voltage ELVDD to the second power supply voltage ELVSS while the driving transistor TD is turned on. The brightness of the pixel PX may increase as the current flowing through the organic light emitting diode EL increases.

The first power supply voltage ELVDD and the second power supply voltage ELVSS may be included in the power supply voltage PWR in FIG. 13. For example, the first power supply voltage ELVDD may be a high power supply voltage, and the second power supply voltage ELVSS may be a low power supply voltage.

In some embodiments, the display panel 710 including the pixel PXa may be a self-emitting display panel that emits light without the use of a backlight unit. For example, the display panel 710 may be an organic light emitting display panel that includes an organic light emitting diode (OLED) as the light emitting element.

In some embodiments, the display panel 710 including the pixel PXa may have relatively excellent retention characteristics capable of performing a low frequency driving. For example, the display panel 710 may be an oxide-based organic light emitting display panel that includes an organic light emitting diode as the light emitting element and includes the transistor including low-temperature polycrystalline oxide (LTPO).

In some embodiments, the switching transistor TS and the driving transistor TD may include LTPO. For example, the driving transistor TD may be a low-temperature poly-silicon (LTPS) thin film transistor (TFT) including LTPS, and the switching transistor TS may be an oxide TFT including oxide semiconductor. The LTPS TFT may be suitable or appropriate for a current driving because of relatively high electron mobility. The oxide TFT may be suitable or appropriate for a switching because of relatively low leakage current. Thus, when the LTPS TFT and the oxide TFT are used together, excellent characteristics (e.g., the excellent retention characteristics) may be obtained. A pixel that includes both the LTPS TFT and the oxide TFT may be referred to as a LTPO pixel, and a display panel that includes the LTPO pixel may be referred to as a hybrid oxide panel (HOP). For example, the HOP may maintain an image for a maximum of about one second with a single update, and thus the HOP may be driven with relatively low frequency even if the display driver integrated circuit does not include a frame buffer, thereby reducing the power consumption.

In some embodiments, the pixel PXa may have various configurations depending on a driving scheme of the display device 700. For example, the display device 700 may be driven with an analog or a digital driving scheme. While the analog driving scheme produces grayscale using variable voltage levels corresponding to input data, the digital driving scheme produces grayscale using a variable time duration in which the light emitting diode emits light. The analog driving scheme is difficult to implement because it requires a driving integrated circuit (IC) that is complicated to manufacture if the display is large and has a high resolution. The digital driving scheme, on the other hand, can readily accomplish the required high resolution through a simpler IC structure.

Referring to FIG. 14B, each pixel PXb may include a switching transistor ST, a liquid crystal capacitor CL and a storage capacitor CS.

The switching transistor ST may connect the capacitors CL and CST to a corresponding data line Di in response to a scan signal SSC transferred through a corresponding gate line Sj. The liquid crystal capacitor CL may be connected between the switching transistor ST and a common voltage VCOM. The storage capacitor CST may be connected between the switching transistor ST and a ground voltage VGND. The liquid crystal capacitor CL may adjust the amount of transmitted light depending on data stored in the storage capacitor CST by a data voltage VDAT.

The common voltage VCOM and the ground voltage VGND may be included in the power supply voltage PWR in FIG. 13.

In some embodiments, the display panel 710 including the pixel PXb may be a liquid crystal display (LCD) panel using a backlight. The liquid crystal display panel may also operate based on the low frequency driving.

Figure 15A:
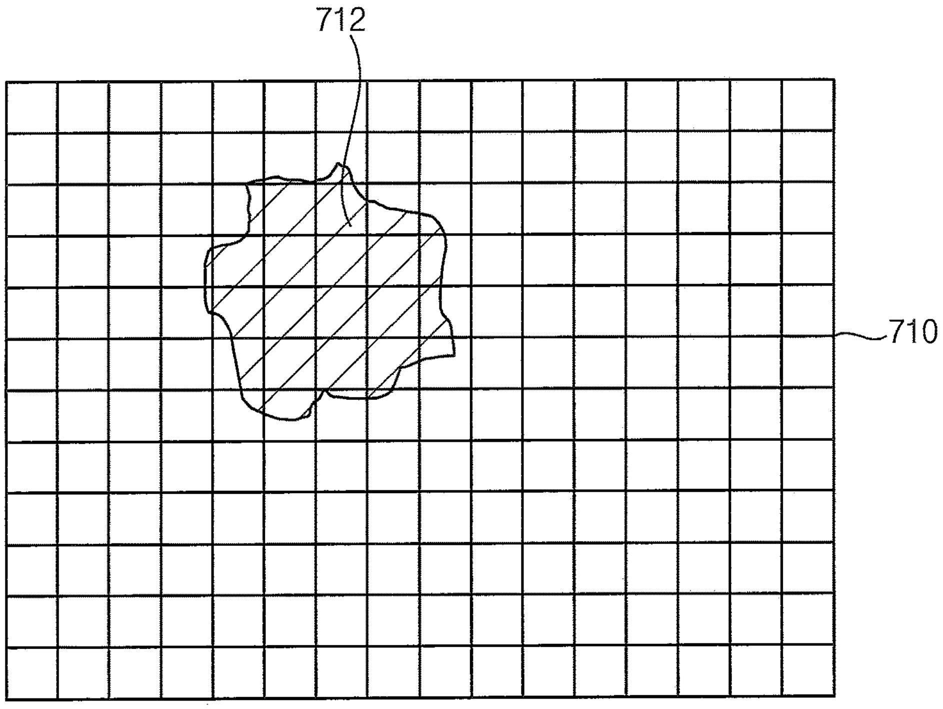
FIGS. 15A, 15B and 15C are diagrams for describing a display panel compensation performed by a display system, according to embodiments.
Figure 15B:
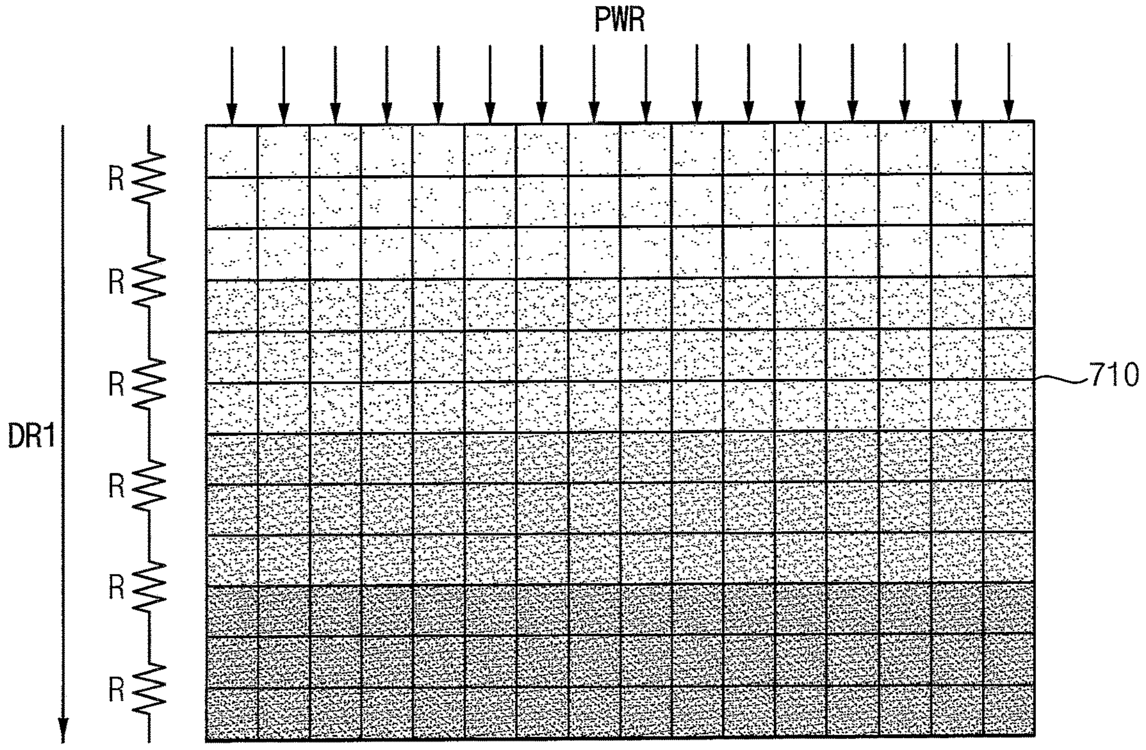
Figure 15C:
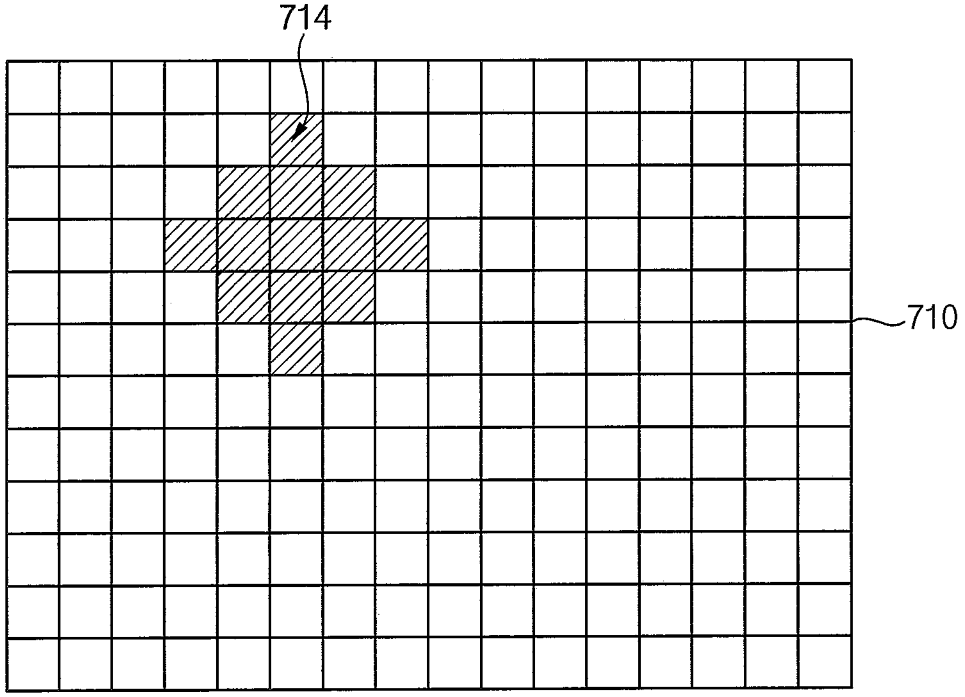

FIGS. 15A, 15B and 15C are diagrams for describing a display panel compensation performed by a display system, according to embodiments.

Referring to FIG. 15A, a spot or stain (e.g., Mura) on the display panel 710 due to variations, defects, etc. during a manufacturing process of the display panel 710 is illustrated. Mura is a Japanese word that means a spot or stain, and represents various types of image quality abnormalities caused by distribution during the manufacturing process. For example, Mura may include defects in which boundaries are vague for a certain region, abnormal non-uniformity in the reproduced screen, and/or visible defects in luminance or chromaticity. For example, Mura may include defects in which a specific region is non-uniformly displayed when the entire screen is displayed with a constant grayscale.

Referring to FIG. 15B, a voltage drop (e.g., IR drop) occurring due to a physical distance difference within the display panel 710 is illustrated. For example, as illustrated in FIG. 15B, since wirings for supplying the power supply voltage PWR are formed of resistors R, when the power supply voltage PWR is provided from the upper portion to the lower portion of the display panel 710, a voltage drop with respect to the power supply voltage PWR may occur as a distance from the upper portion of the display panel 710 increases. As a result, when the entire screen is displayed with a constant grayscale, the luminance may gradually decrease from the top to the bottom of the display panel 710 (e.g., along a first direction DR1).

Referring to FIG. 15C, a deterioration (e.g., burn-in) occurring as the display panel 710 is used for a long interval of time is illustrated. For example, when the display panel 710 includes the pixel PXa including the organic light emitting diode EL as illustrated in FIG. 14A, the driving transistor TD and the organic light emitting diode EL may deteriorate over time of use. As illustrated in FIG. 15C, when the same image is repeatedly displayed on a specific region 714 of the display panel 710, the pixel PXa may be deteriorated. Due to the deterioration of the pixel PXa, an image sticking phenomenon in which a mainly used image form permanently appears on a screen, causing a fatal problem in image quality.

In the display system according to embodiments, the panel map data that is used to perform the display panel compensation in the host processor may include information for compensating at least one of the spot described with reference to FIG. 15A, the voltage drop described with reference to FIG. 15B, and the deterioration described with reference to FIG. 15C. However, embodiments are not limited thereto, and the panel map data may include information for compensating various other situations.

FIGS. 16, 17, 18 and 19 are flowcharts illustrating a method of compensating a display panel according to embodiments.

Figure 16:
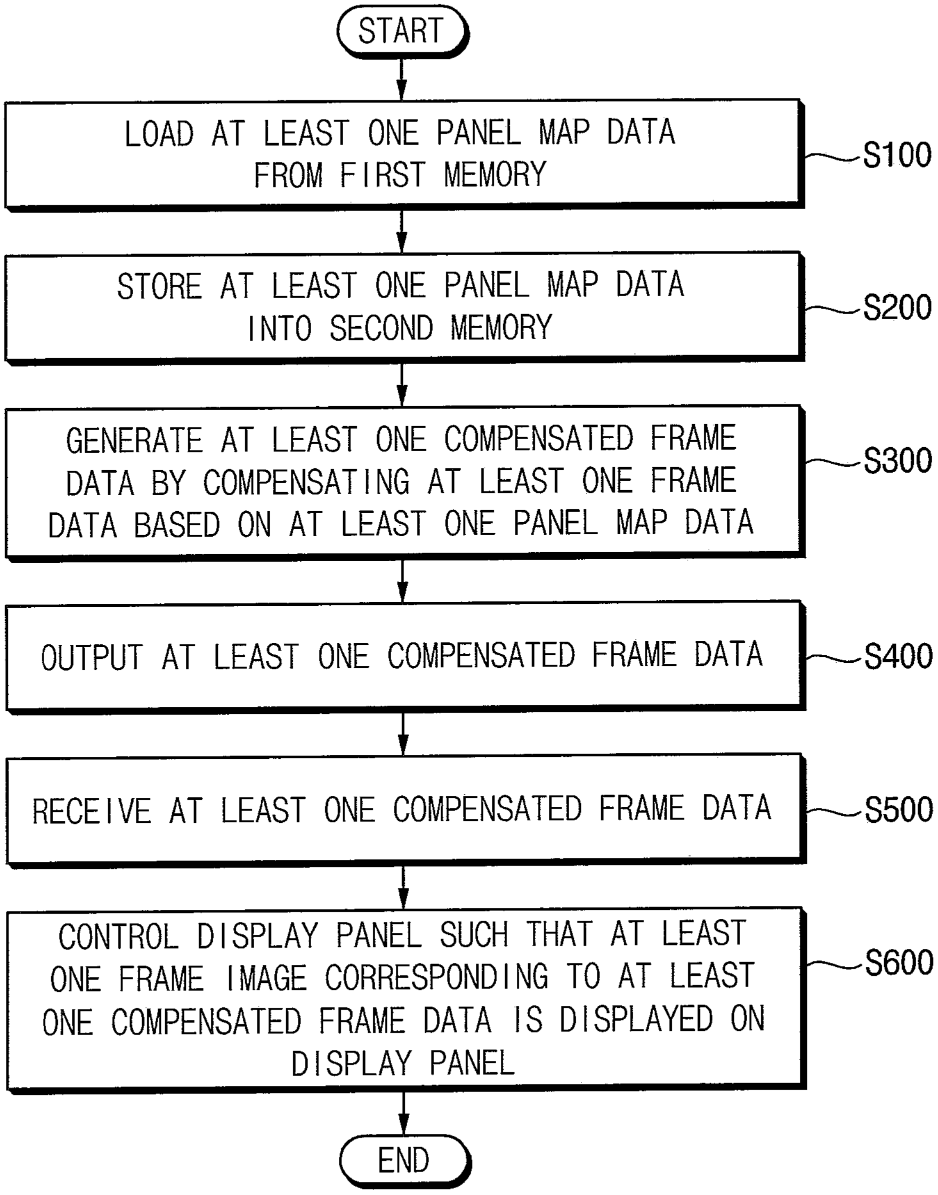
FIGS. 16, 17, 18 and 19 are flowcharts illustrating a method of compensating a display panel, according to embodiments.
Figure 17:
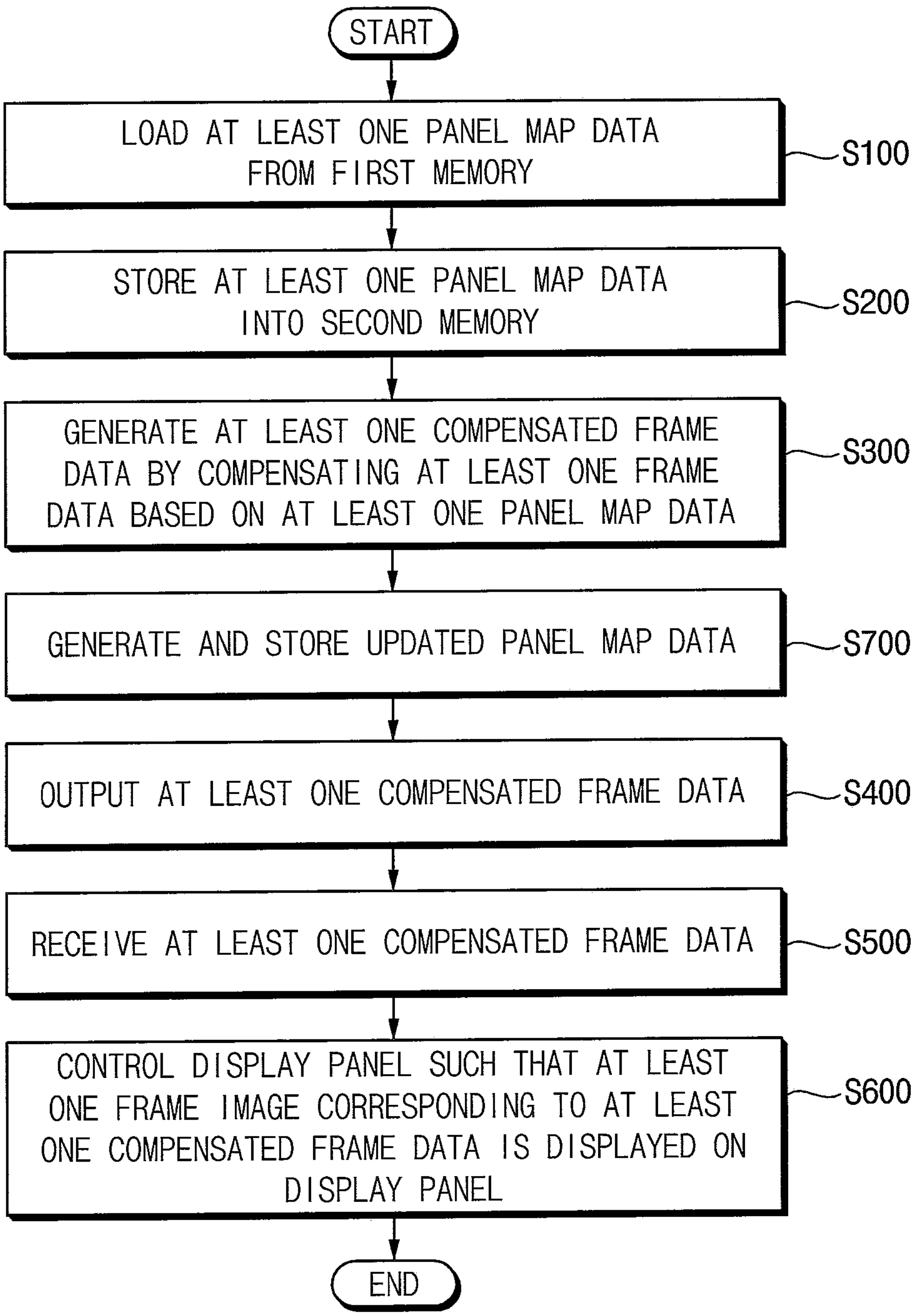

Referring to FIGS. 1, 2 and 16, in a method of compensating a display panel according to embodiments, the host processor 200*a* loads the panel map data PMAP from the first memory 100 located outside the host processor 200 (step S100). The panel map data PMAP includes the plurality of offset values that are used to differently compensate the plurality of pixels included in the display panel 360.

The host processor 200*a* stores the panel map data PMAP in the second memory 210 located inside the host processor 200 (step S200). The host processor 200*a* generates the compensated frame data CFDAT by compensating the frame data FDAT based on the panel map data PMAP (step S300). The host processor 200*a* outputs at least one compensated frame data CFDAT (step S400). For example, step S300 may be performed as described with reference to FIGS. 4A, 4B, 4C, 4D and 4E.

The display driver integrated circuit 310 receives the compensated frame data CFDAT (step S500). The display driver integrated circuit 310 controls the display panel 360 such that the frame image corresponding to the compensated frame data CFDAT is displayed on the display panel 360 (step S600).

Referring to FIGS. 1, 5, 8 and 17, in a method of compensating a display panel according to embodiments, steps S100, S200, S300, S400, S500 and S600 may be substantially the same as steps S100, S200, S300, S400, S500 and S600 in FIG. 16, respectively.

The updated panel map data UPMAP may be periodically generated based on the frame data FDAT or the compensated frame data CFDAT, and the updated panel map data UPMAP may be periodically stored in the second memory 210 (step S700). The updated panel map data UPMAP may be different from the panel map data PMAP. In some embodiments, step S700 may be performed by the panel compensator 223 included in the display controller 220*b* included in the host processor 200*b* in FIG. 5. In other embodiments, step S700 may be performed by the display characteristic detector 400 located outside the host processor 200*e* in FIG. 8. In addition, in step S300, the updated panel map data UPMAP may be additionally used to generate the compensated frame data CFDAT.

Figure 18:
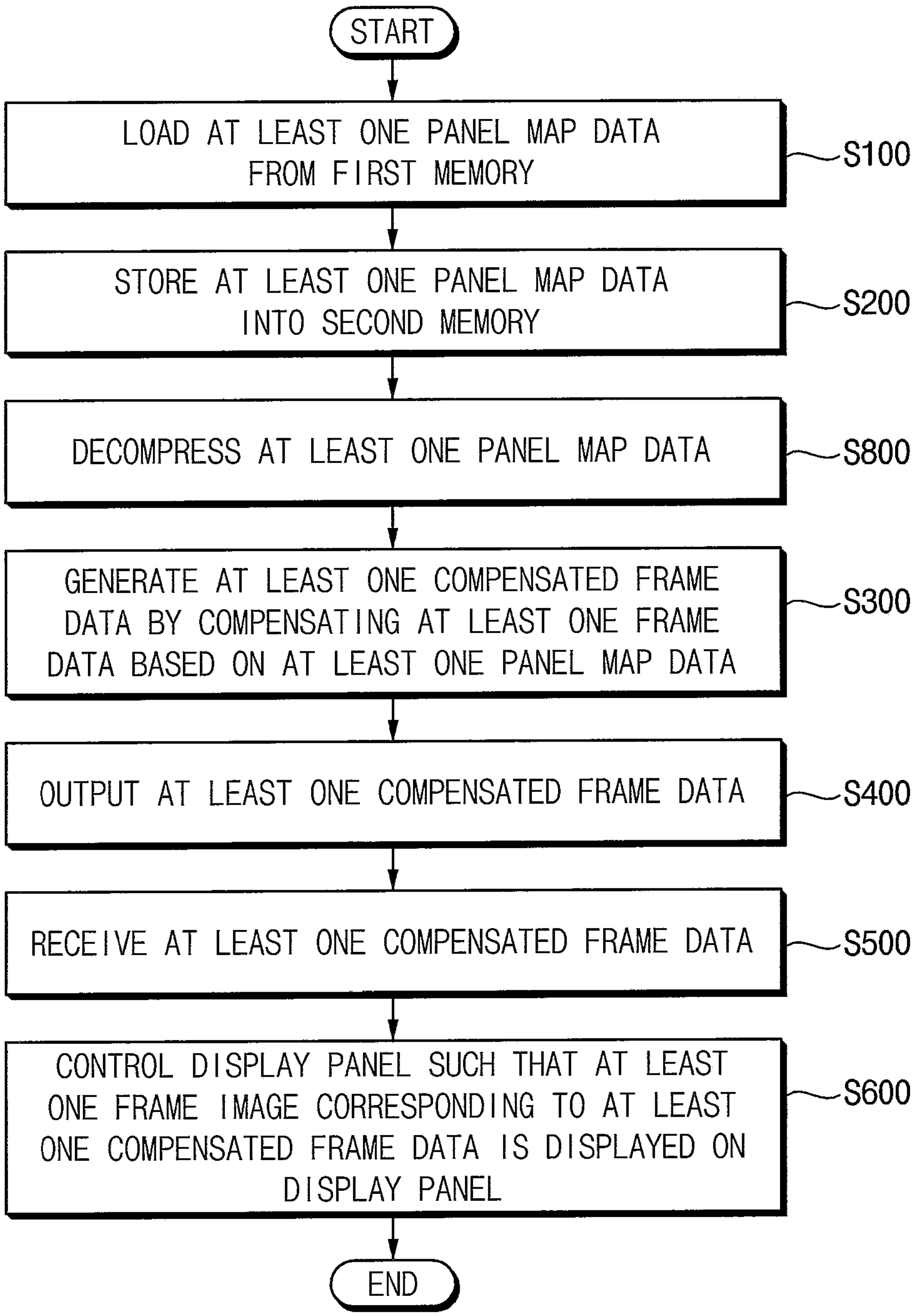

Referring to FIGS. 1, 6 and 18, in a method of compensating a display panel according to embodiments, steps S100, S200, S300, S400, S500 and S600 may be substantially the same as steps S100, S200, S300, S400, S500 and S600 in FIG. 16, respectively.

The first and second memories 100 and 210 may store the compressed panel map data PMAP' to reduce or save the usage of the memory bandwidth. The compressed panel map data PMAP' may be decompressed to generate the panel map data PMAP (step S800). For example, step S800 may be performed by the decompressor 224. Step S300 may be performed based on the decompressed panel map data PMAP.

Figure 19:
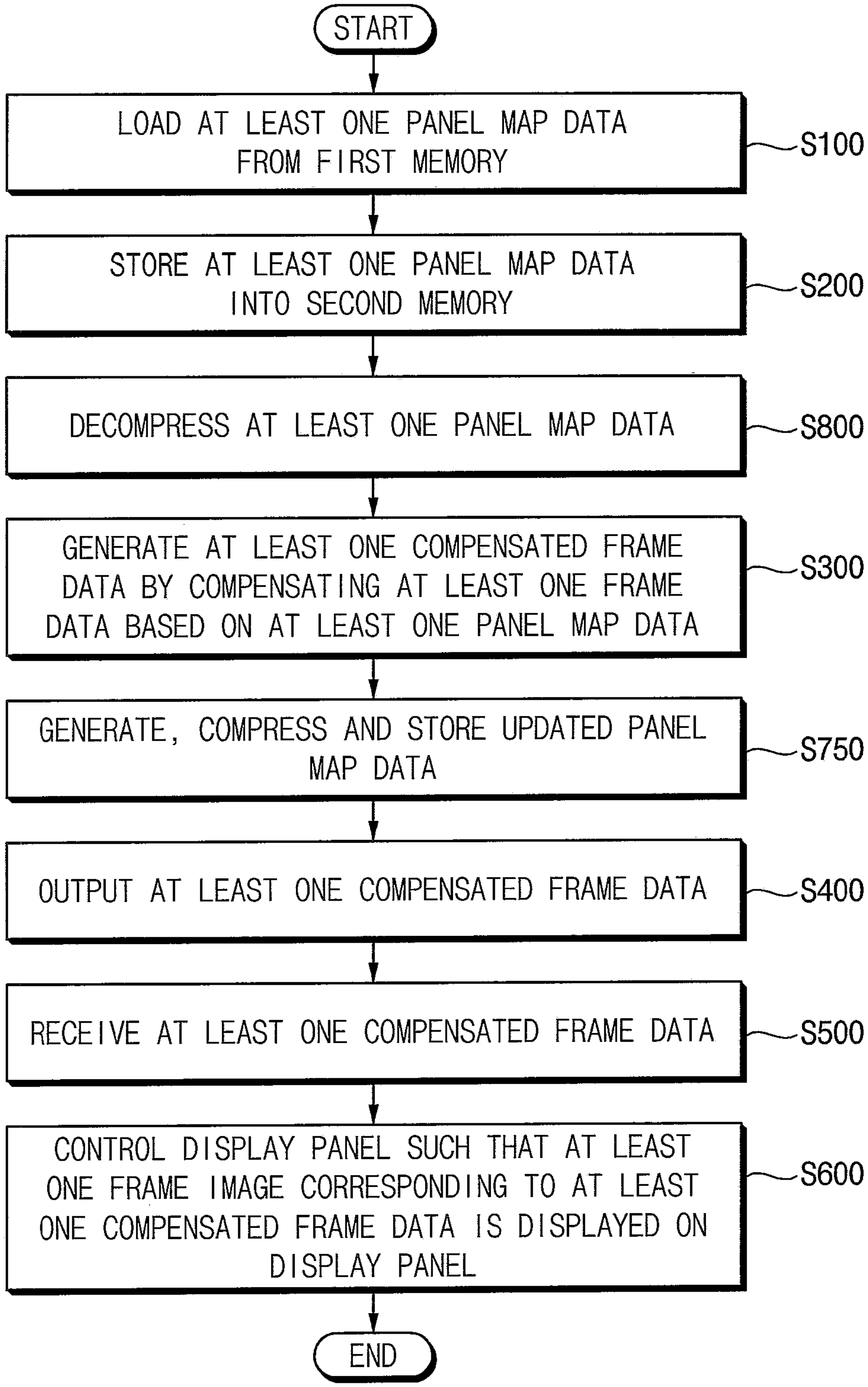

Referring to FIGS. 1, 7 and 19, in a method of compensating a display panel according to embodiments, steps S100, S200, S300, S400, S500 and S600 may be substantially the same as steps S100, S200, S300, S400, S500 and S600 in FIG. 16, respectively. Step S800 may be substantially the same as step S800 in FIG. 18.

The updated panel map data UPMAP may be periodically generated based on the frame data FDAT or the compensated frame data CFDAT, the updated panel map data UPMAP may be compressed to generate the compressed updated panel map data UPMAP', and the compressed updated panel map data UPMAP' may be periodically stored in the second memory 210 (step S750). Step S750 may be substantially the same as step S700 in FIG. 17, except that the compression is additionally performed. For example, the compression may be performed by the compressor 240.

In some embodiments, in the methods of FIGS. 16, 17, 18 and 19, the display panel compensation may be performed based on two or more panel maps as described with reference to FIGS. 9 through 12.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 20:
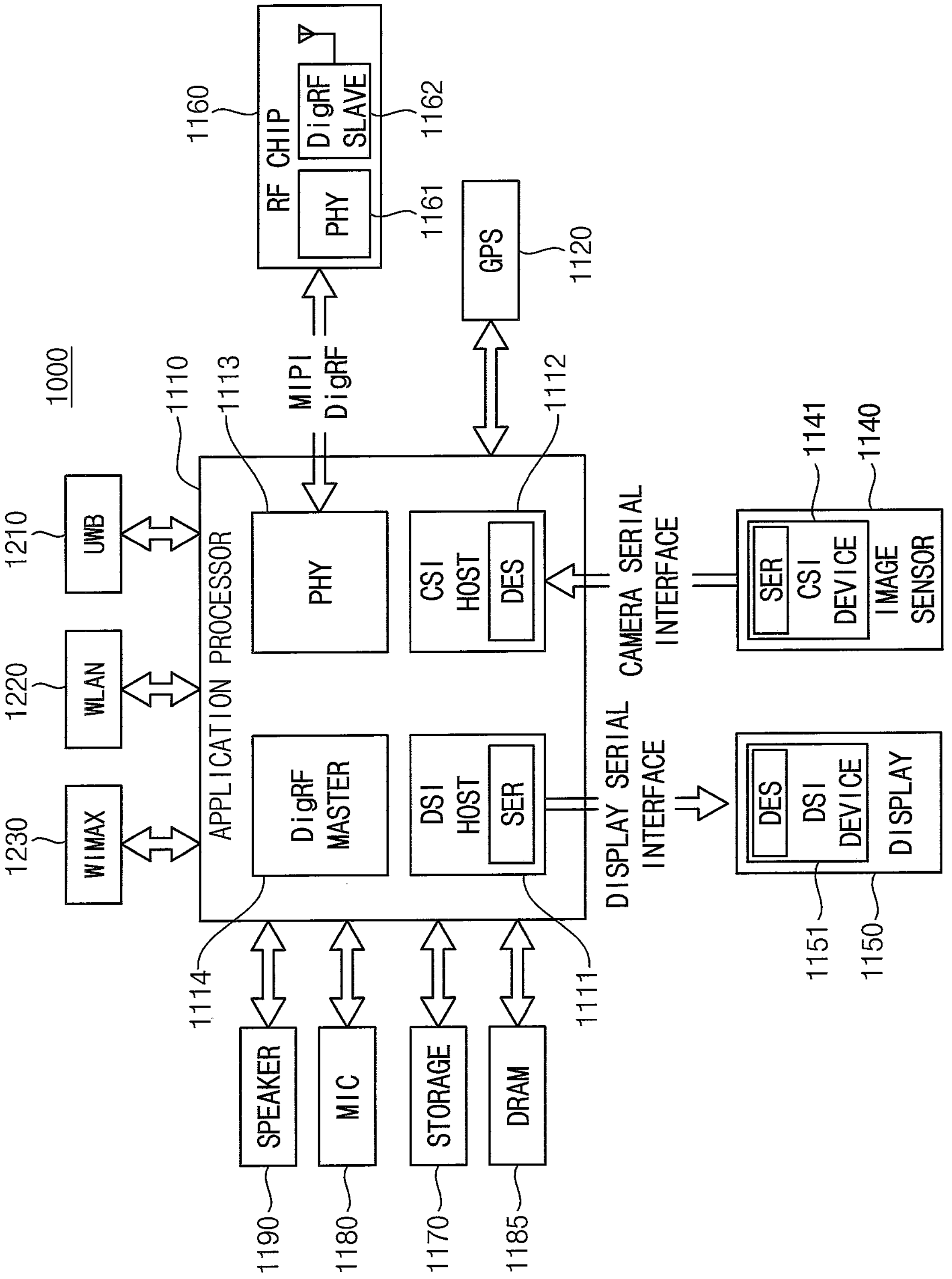
FIG. 20 is a block diagram illustrating an electronic system including a display system, according to embodiments.

FIG. 20 is a block diagram illustrating an electronic system including a display system according to embodiments.

Referring to FIG. 20, an electronic system 1000 may be implemented as a data processing device that uses or supports a mobile industry processor interface (MIPI). The electronic system 1000 may include an application processor 1110, an image sensor 1140, a display device 1150, etc. The electronic system 1000 may further include a radio frequency (RF) chip 1160, a global positioning system (GPS) 1120, a storage 1170, a microphone (MIC) 1180, a dynamic random access memory (DRAM) 1185 and a speaker 1190. In addition, the electronic system 1000 may perform communications using an ultra-wideband (UWB) 1210, a wireless local area network (WLAN) 1220, a worldwide interoperability for microwave access (WIMAX) 1230, etc.

The application processor 1110 may be a controller or a processor that controls operations of the image sensor 1140 and the display device 1150.

The application processor 1110 may include a display serial interface (DSI) host 1111 that performs a serial communication with a DSI device 1151 of the display device 1150, a camera serial interface (CSI) host 1112 that performs a serial communication with a CSI device 1141 of the image sensor 1140, a physical layer (PHY) 1113 that performs data communications with a PHY 1161 of the RF chip 1160 based on a MIPI DigRF, and a DigRF MASTER 1114 that controls the data communications of the physical layer 1161. A DigRF SLAVE 1162 of the RF chip 1160 may be controlled through the DigRF MASTER 1114.

In some embodiments, the DSI host 1111 may include a serializer (SER), and the DSI device 1151 may include a deserializer (DES). In some embodiments, the CSI host 1112 may include a deserializer (DES), and the CSI device 1141 may include a serializer (SER).

The application processor 1110 may be the host processor according to embodiments, and the DSI device 1151 may be the display driver integrated circuit according to embodiments. The application processor 1110 and the DSI device 1151 may form the display system according to embodiments, and may perform the method of compensating the display panel according to embodiments.

At least one of the panel compensator, the compressor, the decompressor, and the display characteristic detector, the timing controller, and the row/column driver represented by respective blocks in shown in FIGS. 2 and 5-12 may be embodied as various numbers of hardware, software and/or firmware structures that execute respective functions described above, according to an embodiment. According to embodiments, at least one of these elements may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses.

The inventive concept may be applied to various electronic devices and systems that include the display devices and the display systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some embodiments have been described, those skilled in the art will readily appreciate that many modifications are possible in the embodiments without materially departing from the novel teachings and advantages of the embodiments. Accordingly, all such modifications are intended to be included within the scope of the embodiments as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display system comprising:

a host processor configured to compensate at least one set of frame data based on at least one set of panel map data comprising a plurality of offset values corresponding to a plurality of pixels of a display panel, generate at least one set of compensated frame data, and output the compensated frame data;

a display driver integrated circuit configured to receive the compensated frame data from the host processor, and control the display panel such that at least one frame image corresponding to the compensated frame data is displayed on the display panel, a first memory configured to store the panel map data and provide the panel map data to the host processor, a display characteristic detector configured to periodically generate updated panel map data by analyzing a characteristic of the display panel;

wherein the host processor comprises:

a second memory configured to receive from the first memory and store the panel map data;

a panel compensator configured to generate the compensated frame data by compensating the frame data based on the plurality of offset values, the frame data comprising a plurality of pixel values, the compensated frame data comprising a plurality of compensated pixel values, the plurality of compensated pixel values being generated by compensating the plurality of pixel values based on the plurality of offset values; and a display interface configured to output the compensated frame data;

wherein the updated panel map data is different from the panel map data;

wherein the second memory is configured to periodically store the updated panel map data wherein the host processor further compensates the at least one set of frame data based on the updated panel map data.

2. The display system of claim 1, wherein the panel map data is compressed, and wherein the host processor further comprises a decompressor configured to decompress the panel map data stored in the second memory, and to provide the decompressed panel map data to the panel compensator.

3. The display system of claim 1, wherein the panel compensator is configured to periodically generate updated panel map data based on the frame data or the compensated frame data, the updated panel map data being different from the panel map data, and wherein the second memory is configured to periodically store the updated panel map data.

4. The display system of claim 3, wherein the host processor further comprises a compressor configured to compress the updated panel map data, and provide the compressed updated panel map data to the second memory.

5. The display system of claim 3, wherein the host processor is configured to periodically transmit the updated panel map data to the first memory, and wherein the first memory is configured to periodically store the updated panel map data.

6. The display system of claim 1, wherein the first memory is a nonvolatile memory, and the second memory is a volatile memory.

7. The display system of claim 1, wherein each of the plurality of offset values corresponds to a respective one of the plurality of pixels, and the frame data comprises a plurality of pixel values, and wherein the host processor is configured to compensate the plurality of pixel values based on the plurality of offset values, respectively.

8. The display system of claim 1, wherein the plurality of pixels are grouped into a plurality of blocks such that each of the plurality of blocks comprises two or more of the plurality of pixels, and each of the plurality of offset values corresponds to a respective one of the plurality of blocks, wherein the frame data comprises a plurality of pixel values, and wherein the host processor is configured to compensate the plurality of pixel values based on the plurality of offset values such that pixel values included in a same block are compensated based on a same offset value.

9. The display system of claim 1, wherein the panel map data comprises a set of first panel map data and a set of second panel map data, wherein the frame data comprises a set of first frame data and a set of second frame data, and wherein the first frame data and the second frame data are compensated based on the first panel map data and the second panel map data, respectively.

10. The display system of claim 9, further comprising at least one environmental sensor configured to obtain environment information about a surrounding environment in which the display system is driven, and wherein the first panel map data and the second panel map data are applied to the first frame data and the second frame data, respectively, based on the environment information.

11. The display system of claim 1, wherein each of the plurality of offset values is set to be greater than or equal to a minimum offset value, and is set to be less than or equal to a maximum offset value, and wherein at least one of the minimum offset value and the maximum offset value is changeable.

12. The display system of claim 1, wherein the plurality of offset values are used for compensating a spot on the display panel corresponding to one or more of the plurality of pixels.

13. The display system of claim 1, wherein the plurality of offset values are used for compensating a voltage drop in the display panel.

14. The display system of claim 1, wherein the plurality of offset values are used for compensating deterioration due to cumulative usage of the display panel.

15. The display system of claim 1, wherein the display panel is one of an organic light emitting display panel and a liquid crystal display panel.

16. The display system of claim 1, wherein the display driver integrated circuit comprises:

a timing controller configured to generate a first control signal, a second control signal and a data signal based on the compensated frame data; and a row/column driver configured to generate a plurality of data voltages and a plurality of scan signals based on the first control signal, the second control signal and the data signal, and provide the plurality of data voltages and the plurality of scan signals to the display panel.

17. A method of compensating a display panel, the method comprising:

loading, by a host processor, at least one set of panel map data from a first memory, the first memory storing the panel map data and being disposed outside or included in the host processor, the panel map data comprising a plurality of offset values that are used to respectively compensate a plurality of pixels included in the display panel;

storing, by the host processor, the panel map data in a second memory, the second memory being included in the host processor;

generating, by the host processor, at least one set of compensated frame data by compensating at least one set of frame data based on the panel map data;

generating periodically, by a display characteristic detector, updated panel map data by analyzing a characteristic of the display panel;

outputting, by the host processor, the compensated frame data;

receiving, by a display driver integrated circuit, the compensated frame data; and controlling, by the display driver integrated circuit, the display panel such that at least one frame image corresponding to the compensated frame data is displayed on the display panel, wherein the frame data comprises a plurality of pixel values, the compensated frame data comprises a plurality of compensated pixel values, and the plurality of compensated pixel values are generated by compensating the plurality of pixel values based on the plurality of offset values, wherein the updated panel map data is different from the panel map data;

wherein the second memory is configured to periodically store the updated panel map data wherein the host processor further compensates the at least one set of frame data based on the updated panel map data.

18. A display system comprising:

a nonvolatile memory configured to store at least one set of panel map data comprising a plurality of offset values corresponding to a plurality of pixels included in a display panel, the panel map data being compressed;

a host processor configured to generate at least one set of compensated frame data by compensating at least one set of frame data based on the panel map data; and a display driver integrated circuit configured to receive the compensated frame data from the host processor, and control the display panel such that at least one frame image corresponding to the compensated frame data is displayed on the display panel, wherein the host processor comprises:

a volatile memory configured to store the panel map data;

a panel compensator configured to generate the compensated frame data by compensating the frame data based on the plurality of offset values, and periodically generate updated panel map data based on the frame data or the compensated frame data, the frame data comprising a plurality of pixel values, the compensated frame data comprising a plurality of compensated pixel values, the plurality of compensated pixel values being generated by compensating the plurality of pixel values based on the plurality of offset values, the updated panel map data being different from the panel map data;

a decompressor configured to decompress the panel map data, and provide the decompressed panel map data to the panel compensator;

a compressor configured to compress the updated panel map data, and provide the compressed updated panel map data to the volatile memory; and a display interface configured to output the compensated frame data, wherein the volatile memory is configured to periodically store the updated panel map data, and wherein, after the updated panel map data is generated, the panel compensator is configured to generate the compensated frame data based on the panel map data and the updated panel map data.

* * * * *